United States Patent
Hansen et al.

(10) Patent No.: US 8,609,249 B2
(45) Date of Patent: Dec. 17, 2013

(54) THIN WALL EXPANDABLE POLYMER TUBES HAVING IMPROVED AXIAL AND RADIAL STRENGTH, AND A METHOD OF MANUFACTURING THEREOF

(75) Inventors: Douglas R. Hansen, Belmont, NC (US); James V. Phillips, Rock Hill, SC (US)

(73) Assignee: Phillips Scientific Inc., Rock Hill, SC (US)

( * ) Notice: Subject to any disclaimer, the term of this patent is extended or adjusted under 35 U.S.C. 154(b) by 351 days.

(21) Appl. No.: 13/186,541

(22) Filed: Jul. 20, 2011

(65) Prior Publication Data

US 2012/0201988 A1    Aug. 9, 2012

Related U.S. Application Data

(60) Provisional application No. 61/441,101, filed on Feb. 9, 2011.

(51) Int. Cl.
*B32B 27/00* (2006.01)

(52) U.S. Cl.
USPC ........ 428/421; 428/36.5; 428/35.7; 428/36.9; 428/36.91; 264/635; 264/127; 264/175; 264/280

(58) Field of Classification Search
USPC .................. 428/421, 36.5, 35.7, 36.9, 36.91; 264/635, 127, 175, 280
See application file for complete search history.

(56) References Cited

U.S. PATENT DOCUMENTS

| | | | |
|---|---|---|---|
| 3,664,915 A | 5/1972 | Gore | |
| 4,049,589 A | 9/1977 | Sakane | |
| 4,350,610 A | 9/1982 | Jung et al. | |
| 5,800,512 A | 9/1998 | Lentz et al. | |
| 5,965,249 A | 10/1999 | Sutton et al. | |
| 5,993,593 A | 11/1999 | Swartz et al. | |
| 6,890,463 B2 | 5/2005 | Martakos et al. | |
| 6,921,606 B2 | 7/2005 | Sassa et al. | |
| 7,442,352 B2 | 10/2008 | Lu et al. | |
| 7,553,543 B2 | 6/2009 | Bekiarian | |
| 2004/0084304 A1 | 5/2004 | Thompson | |
| 2004/0191893 A1 | 9/2004 | Newman et al. | |
| 2005/0074890 A1 | 4/2005 | Lemme et al. | |
| 2005/0244602 A1* | 11/2005 | Oyama et al. ................ | 428/35.7 |
| 2006/0177384 A1 | 8/2006 | Brown | |
| 2007/0026515 A1 | 2/2007 | Newman et al. | |
| 2007/0072956 A1 | 3/2007 | Cody et al. | |
| 2011/0014459 A1 | 1/2011 | Hansen et al. | |

* cited by examiner

*Primary Examiner* — Michael C Miggins

(74) *Attorney, Agent, or Firm* — Jeffrey Watson; Balser & Grell IP Law

(57) ABSTRACT

A method for making a thin walled ePTFE tube having improved axial and radial strength includes the steps of: providing an unsintered or partially sintered ePTFE membrane; wrapping the ePTFE membrane around a mandrel or form tool to form an ePTFE tube; matting the ePTFE tube; immediately thereafter, sintering the matted ePTFE tube; removing the sintered ePTFE tube from the mandrel or form tool; stretching the sintered ePTFE tube in the axial direction; stretching the ePTFE tube in the radial direction over a second mandrel that is greater in diameter than the reduced axially stretched diameter, but less than the first mandrel diameter; overwrapping the second mandrel with a second ePTFE membrane; matting the ePTFE tube; immediately thereafter, sintering the matted ePTFE tube; and removing the sintered ePTFE tube from the second mandrel or form tool.

20 Claims, 20 Drawing Sheets

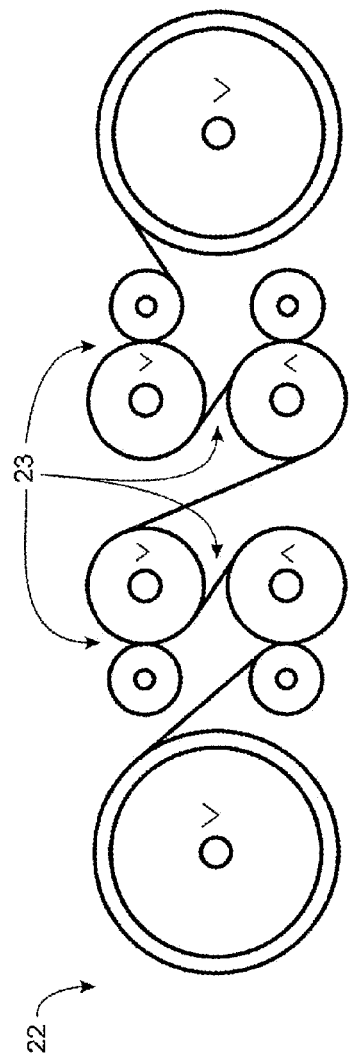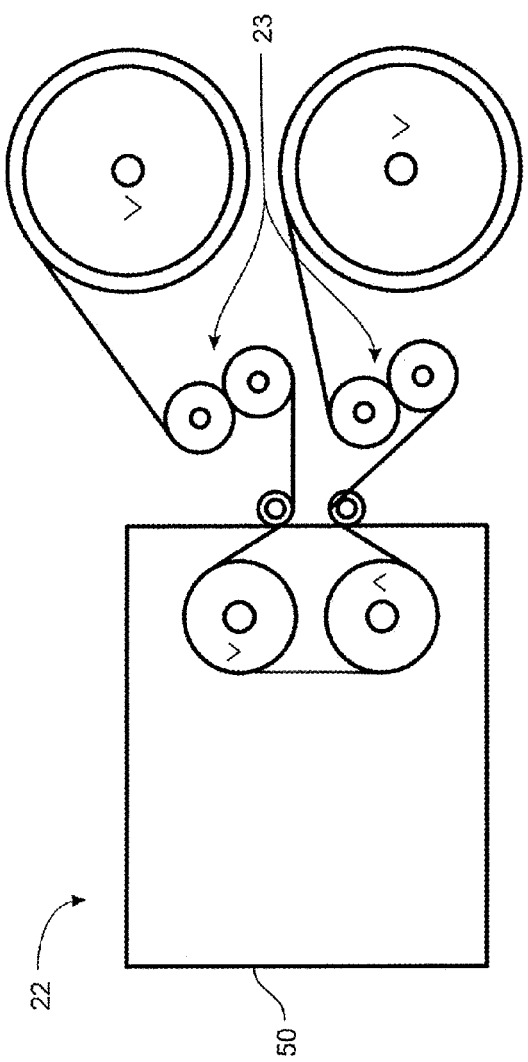

THIN WALL EXPANDABLE POLYMER TUBES HAVING IMPROVED AXIAL AND RADIAL STRENGTH, AND A METHOD OF MANUFACTURING THEREOF

RELATED APPLICATION

This application claims the benefit of co-pending provisional application Ser. No. 61/441,101 filed Feb. 9, 2011.

FIELD OF THE INVENTION

The instant invention relates generally to expandable polymer tubes and methods for the manufacturing of such expandable polymer tubes, such as expanded polytetrafluoroethylene (ePTFE) tubes.

BACKGROUND OF THE INVENTION

An expandable polymer is any polymer capable of being expanded or stretched where it may become a porous membrane. One example of an expandable polymer is polytetrafluoroethylene (PTFE). PTFE is a fluorocarbon solid, as it is a high molecular weight compound consisting wholly of carbon and fluorine. It is an extremely versatile synthetic polymer due to its chemical inertness, wide temperature range, low friction coefficient and biocompatibility.

Expanded PTFE or ePTFE, discovered by W. L. Gore (U.S. Pat. No. 3,664,915), is PTFE that has been stretched to make it porous after being first extruded by a process called paste extrusion. Expanded PTFE has the inherent properties of PTFE, plus it is porous, and has higher strength than PTFE due to the fiber network formed during processing. ePTFE is usually available as a tape, film, or membrane type material.

ePTFE, due to its inertness, wide chemical compatibility and temperature range properties, may be ideal for many medical and industrial applications. Extremely thin and high strength variants of ePTFE are useful for some medical and industrial applications. In the case of endovascular devices, thinner wall, lower friction, higher strength membrane tubing may be desired due to the small diameter arteries that the devices must pass. Acoustic devices, including cell phone speakers and hearing aid device diaphragms, may require high strength flexible membranes and a venting function in order to relieve pressure buildup due to the thermal expansion of air in the device or barometric pressure changes. An industrial application such as a fuel cell MEA requires a high strength ePTFE membrane that has minimal creep and swelling. In the case of a gas or liquid filter that is laminated to a nonwoven or polymer film which is porous or perforated, it is useful to have an ePTFE membrane that has a slick low friction surface that also enables a high strength lamination bond to the nonwoven or polymer to which it is being laminated. The slick membrane surface minimizes filter cake buildup, while the high bond strength helps prevent failure of the laminate, which is reversed to release filter cake buildup. For certain medical device, filtration, chemical cell, or fuel cell applications it is useful to have an ePTFE membrane that bonds well to polymer films so as to provide a thermal melt sealable surface, or to provide a high integrity non porous gasketing surface on the perimeter of the membrane for improved sealing. In the case of solar cells or solar heating systems, UV water and air purification systems an ePTFE membrane with increased light transmittance at wider incidence angles may improve efficiency or performance. For lighting devices, a light diffuser that has a high transmittance, is breathable, and can sustain higher temperatures than other polymers may be desirable. Thus, there is a need to create an ePTFE with unique properties for both medical and industrial applications.

A conventional method of forming an article made of an expandable polymer, such as ePTFE, is to blend a powdered resin with a wettable liquid, such as a lubricant or extrusion aid, and compress the combination into a preformed mold, typically of a cylindrical shape. The wettable liquid may be mixed with the powdered resin to control the degree of material shear that occurs during subsequent extrusion and to prevent excessive shear, which can damage the material. Using a ram-type extruder, the mold may then be extruded through a die having a desired cross-section. The extruded material may be calendered or compressed after extruding to reduce the cross section. Next, the wettable liquid is removed from the extruded material by evaporating the wettable liquid through drying or any another extraction method. The dried extruded material may then be stretched in one or more directions at an elevated temperature below the crystalline melting point of the resin. Finally, the stretched material is typically sintered, or heated to a temperature ranging from just below to significantly above its melting point, depending on the time at the elevated temperature, in order to lock in the physical state of the material.

U.S. Pat. No. 6,890,463 is directed to a method involving rewetting of expandable polymers with a liquid to allow for subsequent enhanced expansion. The wetting liquid includes a drug and/or an agent, such that the resulting polymer contains and emits the drug upon positioning. This method is said to provide the material with unique properties. However, the method teaches that a stretching step be performed after the application of the wetting liquid. Thus, this method is limited to applying the wettable liquid before the expansion step.

U.S. patent application Ser. No. 12/726,707 discloses a method of producing ePTFE tubes having improved axial strength. However, this patent application does not teach or suggest anything about improving the radial strength of the ePTFE tubes.

However, the addition of a wetting liquid, with or without the inclusion of a drug or active agent, to mat down or densify ePTFE reinforcement material, applied over a tube of axially improved strength produced according to the method disclosed in U.S. Publication No. US2011/0014459, after expansion of the reinforcement material and without any subsequent expansion, prior to high temperature sintering, may be advantageous in providing an ePTFE tube with unique properties. The instant invention is designed to address this issue.

SUMMARY OF THE INVENTION

The instant invention includes a method for making thin walled ePTFE tubes having high axial and radial strength. The method may include the steps of: providing an unsintered or partially sintered ePTFE membrane; wrapping the membrane around a mandrel or form tool to form an ePTFE tube; matting the ePTFE tube; immediately thereafter, sintering the matted ePTFE tube; removing the sintered ePTFE tube from the mandrel or form tool; stretching the sintered ePTFE tube in the axial direction; stretching the ePTFE tube in the radial direction over a second mandrel that is greater in diameter than the reduced axially stretched diameter, but less than the first mandrel diameter; overwrapping the second mandrel with ePTFE membrane; matting the ePTFE tube; immediately thereafter, sintering the matted ePTFE tube; and removing the sintered ePTFE tube from the second mandrel or form tool.

BRIEF DESCRIPTION OF THE DRAWINGS

For the purpose of illustrating the invention, there is shown in the drawings a form that is presently preferred; it being understood, however, that this invention is not limited to the precise arrangements and instrumentalities shown.

FIG. 8 are schematic drawings of two embodiments of stretching the tape in the machine direction according to the instant invention.

DETAILED DESCRIPTION OF THE DRAWINGS

Figure 1:
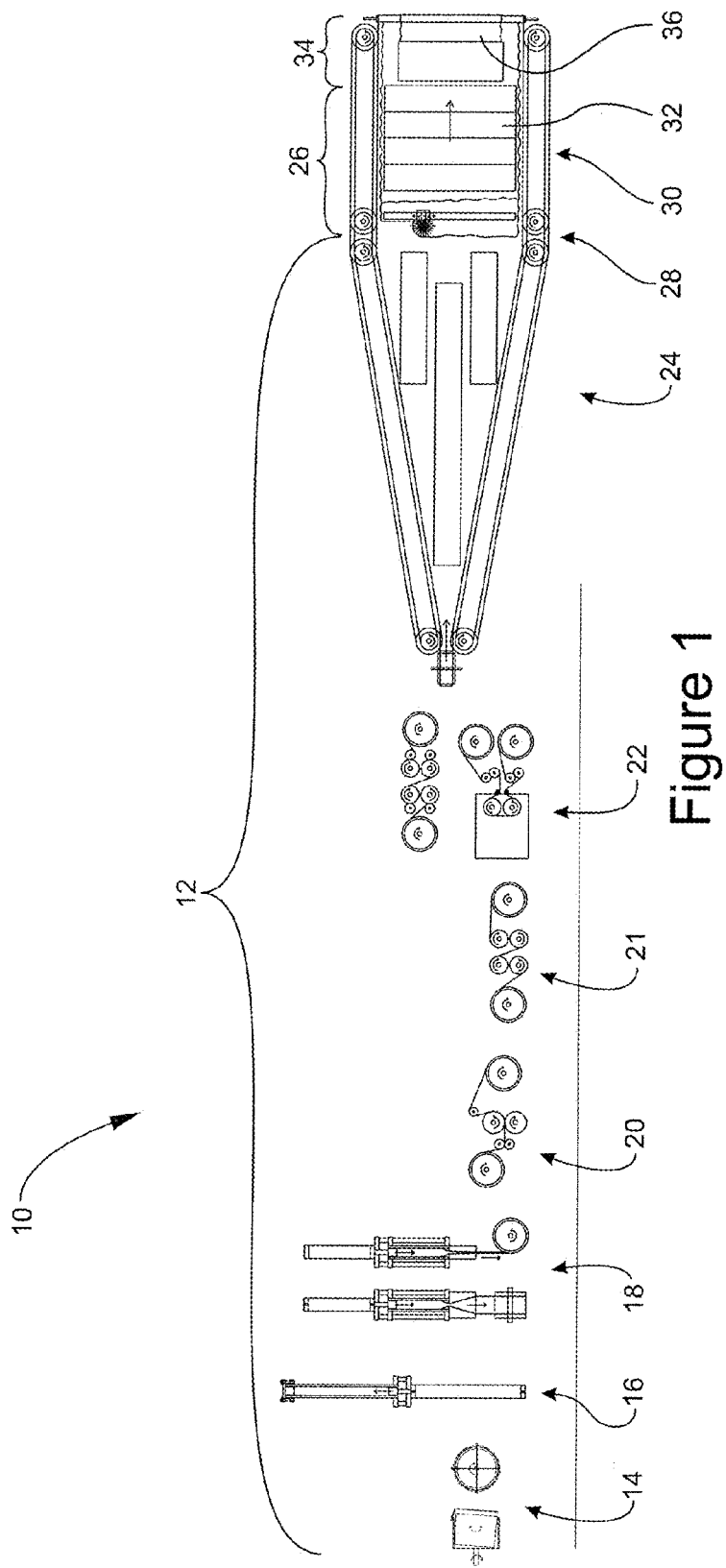
FIG. 1 is a schematic drawing of one embodiment of the method of making an ePTFE according to the instant invention.
Figure 2:
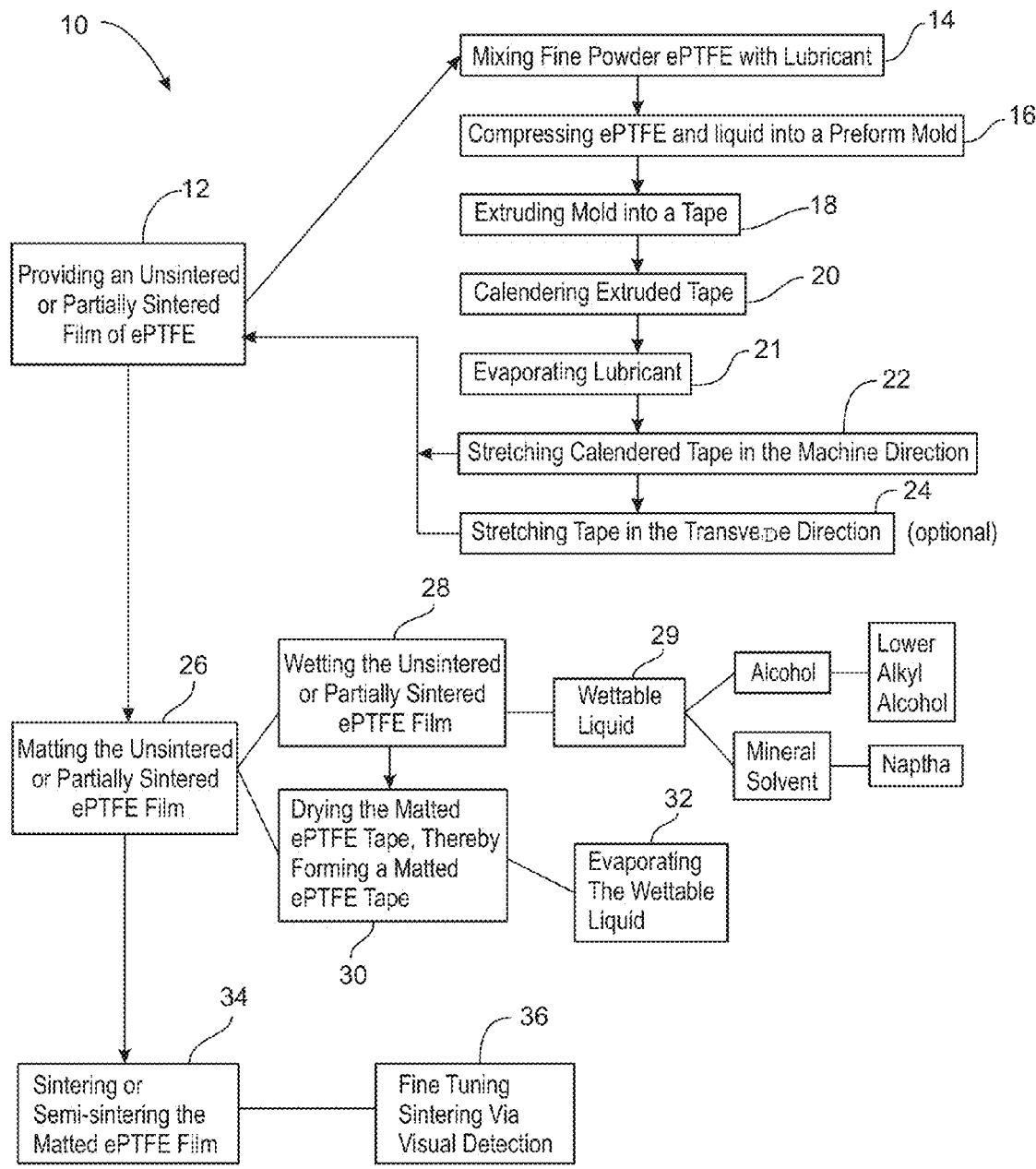
FIG. 2 is a flow diagram of one embodiment of the method of making an ePTFE membrane according to the instant invention.

Referring to the drawings, wherein like numerals indicate like elements, there is shown in FIGS. 1 and 2 an embodiment of a method 10 for manufacturing expanded polytetrafluoroethylene, also known as ePTFE. Although the instant invention is directed to a method of making ePTFE, the invention is not so limited. The instant invention may also be utilized in making any expandable polymer, including, but not limited to, PET (polyethylene terephthalate), and UHMWPE (ultra high molecular weight polyethylene). Method 10 for making ePTFE may generally include, but is not limited to, the following steps: a step 12 of providing an unsintered or partially sintered, ePTFE membrane; a step 26 of matting the unsintered or partially sintereed, stretched PTFE membrane; and a step 34 of sintering the matted PTFE membrane.

Step 12 of providing an unsintered or partially sintered ePTFE membrane 13 may be included in method 10. See FIGS. 1-9. Step 12 may include providing membrane 13 by any means known in the art. Unsintered or partially sintered ePTFE membrane 13 may be any PTFE, ePTFE membrane or other expandable polymer membrane. In one embodiment, step 12 of providing an unsintered or partially sintered ePTFE membrane may include, but is not limited to, the following steps: a step 14 of mixing a powder PTFE resin 42 (typically a fine powder) with a lubricant 38 creating a mix 15; a step 16 of compressing mix 15 into a preform mold 17; a step 18 of extruding the preform mold 17 into a tape 19; a step 20 of calendering the extruded tape 19; a step 21 of evaporating the lubricant 38 from the extruded tape 17; a step 24 of stretching the calendered tape 17 in the machine direction; and a step 24 of stretching the calendered tape 17 in the transverse direction. These steps may provide an unsintered or partially sintered ePTFE membrane 15 and are further described below.

Figure 3:
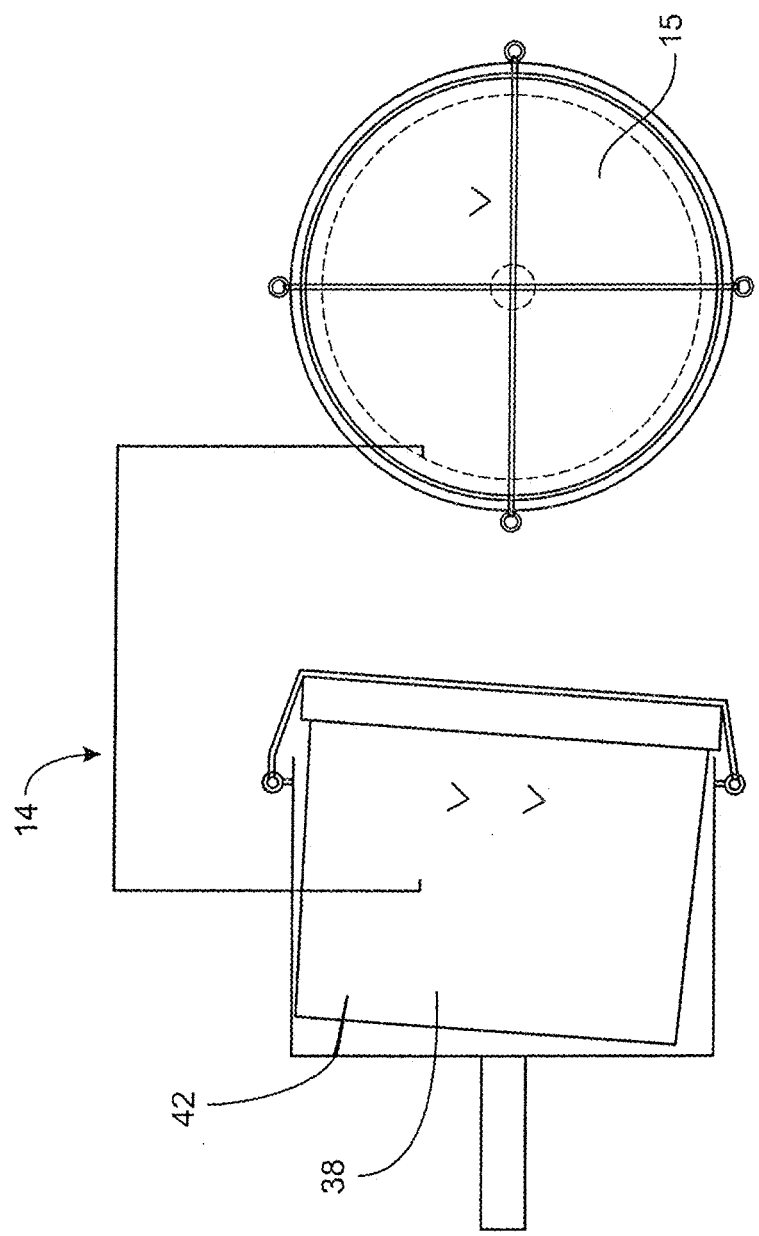
FIG. 3 is a schematic drawing of one embodiment of the step of mixing a fine powder PTFE resin with a lubricant according to the instant invention.
Figure 4:
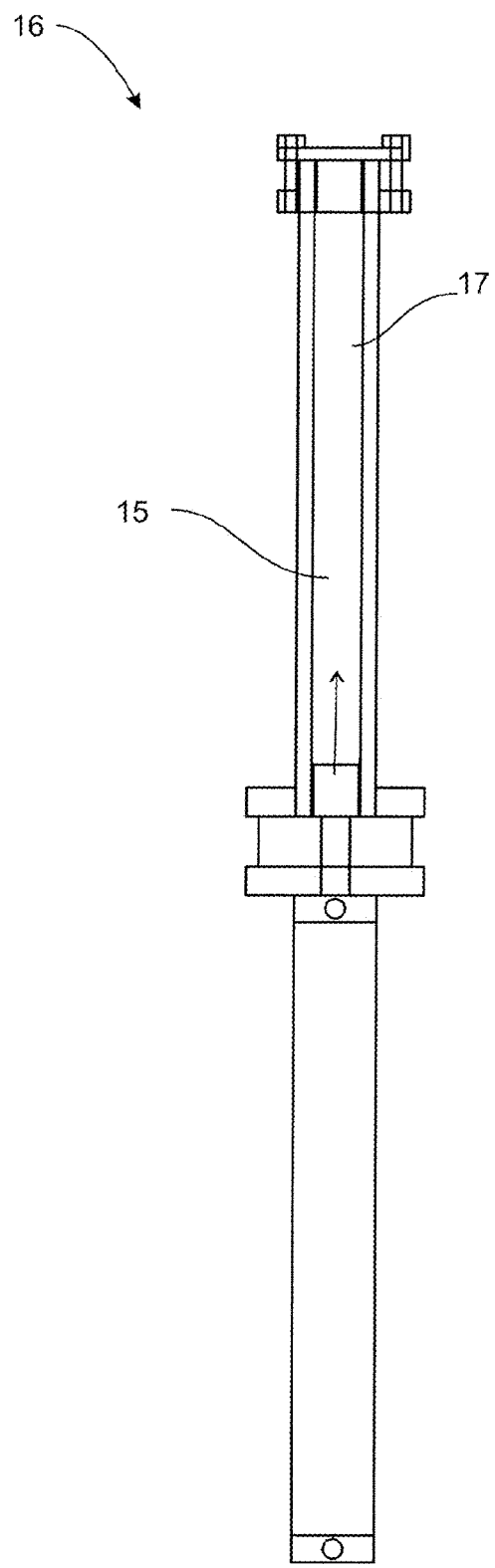
FIG. 4 is a schematic drawing of one embodiment of the step of compressing the mix into a preform mold according to the instant invention.
Figure 5:
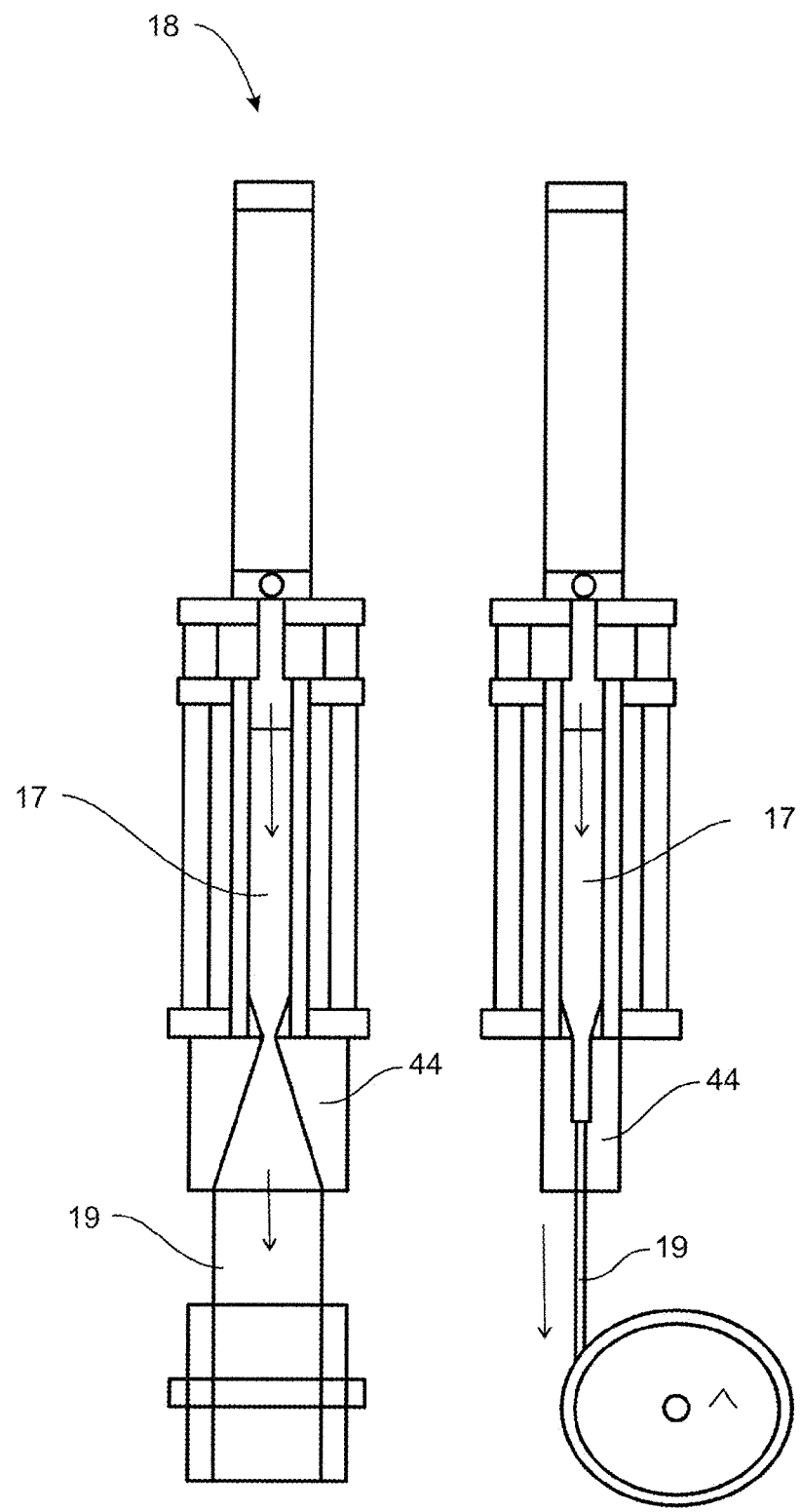
FIG. 5 is a schematic drawing of one embodiment of the step of extruding the molded mix into a tape according to the instant invention.
Figure 6:
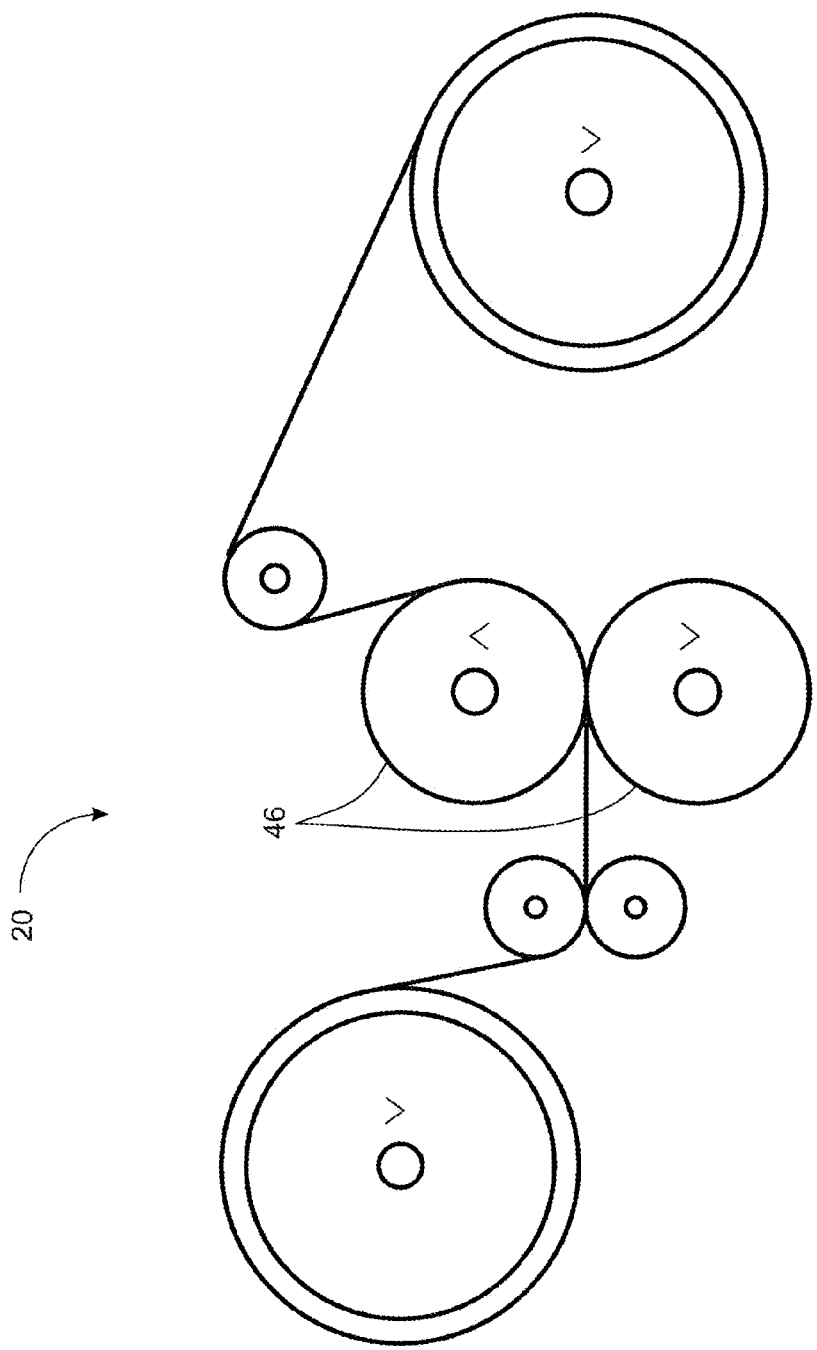
FIG. 6 is a schematic drawing of one embodiment of the step of calendering the extruded tape according to the instant invention.
Figure 7:
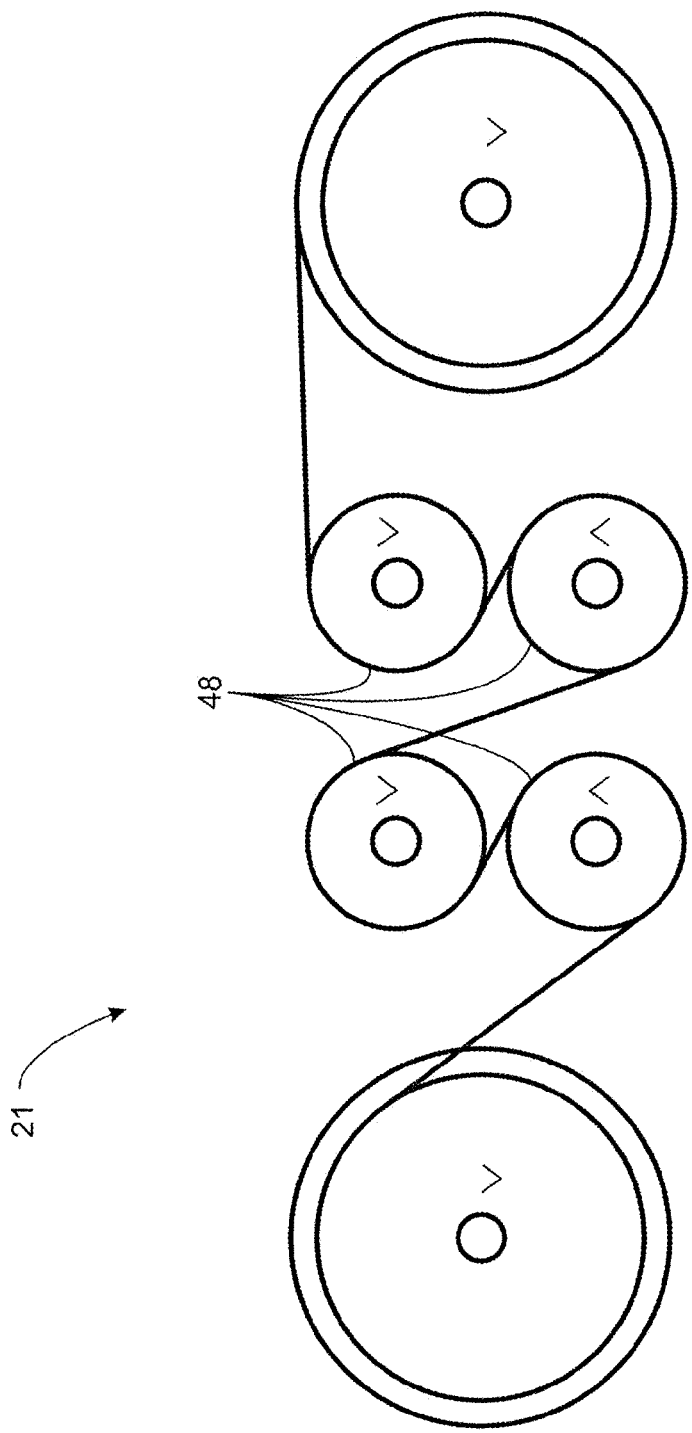
FIG. 7 is a schematic drawing of one embodiment of evaporating the lubricant according to the instant invention.

The first step of providing an unsintered or partially sintered ePTFE membrane may be a step 14 of mixing a powder polytetrafluoroethylene resin 42 with a lubricant 38 creating a mix 15. See FIG. 3. Step 14 may be to control the degree of material shear that occurs during subsequent extrusion and to prevent excessive shear, which can damage the material. Step 14 may include any steps for mixing resin 42 with lubricant 38 to create mix 15. In one embodiment, step 14 may include pouring resin 42 and lubricant 38 into an eccentrically rotating mixing barrel to mix the two ingredients. The left view of FIG. 3 shows the barrel positioned eccentrically in a cut-away view of the mixer. The right view of FIG. 3 is an end view showing the barrel mounted in the mixer. The mixing may be manual or automated. For example, a high molecular weight fine powder PTFE resin, such as Dupont® 601A, Daikin® F131, Solvay Solexis® DF132 may be mixed with a mineral solvent such as Isopar C, K, H, or M, VM&P Naptha or Mineral spirits. The ingredients may be mixed in the proportion of between 80 to 120 grams of solvent to one pound of PTFE fine Powder Resin.

The next step after mixing the PTFE resin and lubricant may be a step 16 of compressing mix 15 into a preform mold 17. See FIG. 4. Step 16 may be for compressing the air out of mix 15 and for providing mix 15 in a specific form or mold for extrusion. Step 16 may include any steps for compressing mix 15 into preform mold 17. In one embodiment, step 16 may include pouring mix 15 into a tube and slowly compressing the mix with an air, hydraulic, or electrical actuated ram.

The next step after compressing the mix into a preform mold may be a step 18 of extruding preform mold 17 into tape 19. See FIG. 5. Step 18 may be for making mold 17 into the form of tape 19. Step 18 may include any steps for making mix 15 take the form of tape 19. Step 18 may include any extruding steps known in the art. In one embodiment, step 18 may include forcing extruding mold 17 from a slot die 44 through a paste-type extruder to obtain tape 19.

The next step after extruding the tape may be an optional step 20 of calendering the extruded tape 17. See FIG. 6. Step 20 may be for compressing tape 17 to a certain thickness and to impart strength to the extruded tape. Step 20 may include any calendering steps known in the art. In one embodiment, step 20 of calendaring extruded tape 17 may include passing tape 17 through a single pair of calender rolls 46. In another embodiment, step 20 may include passing tape 17 through any number of calender rolls 46.

The next step after calendering the tape may be a step 21 of evaporating the lubricant 38 from the extruded tape 17. See FIG. 7. Step 21 may be for removing the lubricant from the tape. Step 21 may include any steps for removing the lubricant from the tape. In one embodiment, step 21 may include passing tape 21 through one or a plurality of heated rolls 48. In another embodiment, step 21 may include passing tape 21 over a curved heated plate or through an oven. Basically, step 21 requires the extruded tape 17 to be heated to a temperature high enough to evaporate the lubricant.

The next step after evaporating the lubricant from the extruded tape may be a step 22 of stretching the calendered tape 17 in the machine direction (MD). See FIG. 8. Step 22 may be for stretching tape 17 in the machine direction to orient the fibers in the machine direction. The stretching may reduce the thickness of the tape to create a more membrane like material. Step 22 may include any steps for stretching tape 17 in the machine direction. The total MD stretch provided in step 22 may be anywhere from 1:1 up to 100:1 In one embodiment, the total MD stretch of step 22 may be from 4:1 to 50:1. In one embodiment, step 22 may include passing tape 17 through a plurality of heated nip rolls 23. See FIG. 8A. Heated nip rolls 23 may be set to any temperature, including, but not limited to 300° F. In another embodiment, step 22 may include passing tape 17 through a high temperature stretch oven 50 during stretching. See FIG. 8B. High temperature stretch oven 50 may be set to any temperature, including, but not limited to 600° F. In another embodiment, step 22 may include passing tape 17 through a plurality of heated nip rolls 23 and high temperature convection oven 50. Infrared heaters may also be used to heat the tape while performing MD stretching. Step 22 may be carried out by stretching the tape in the MD direction one time, or in several passes.

Figure 9:
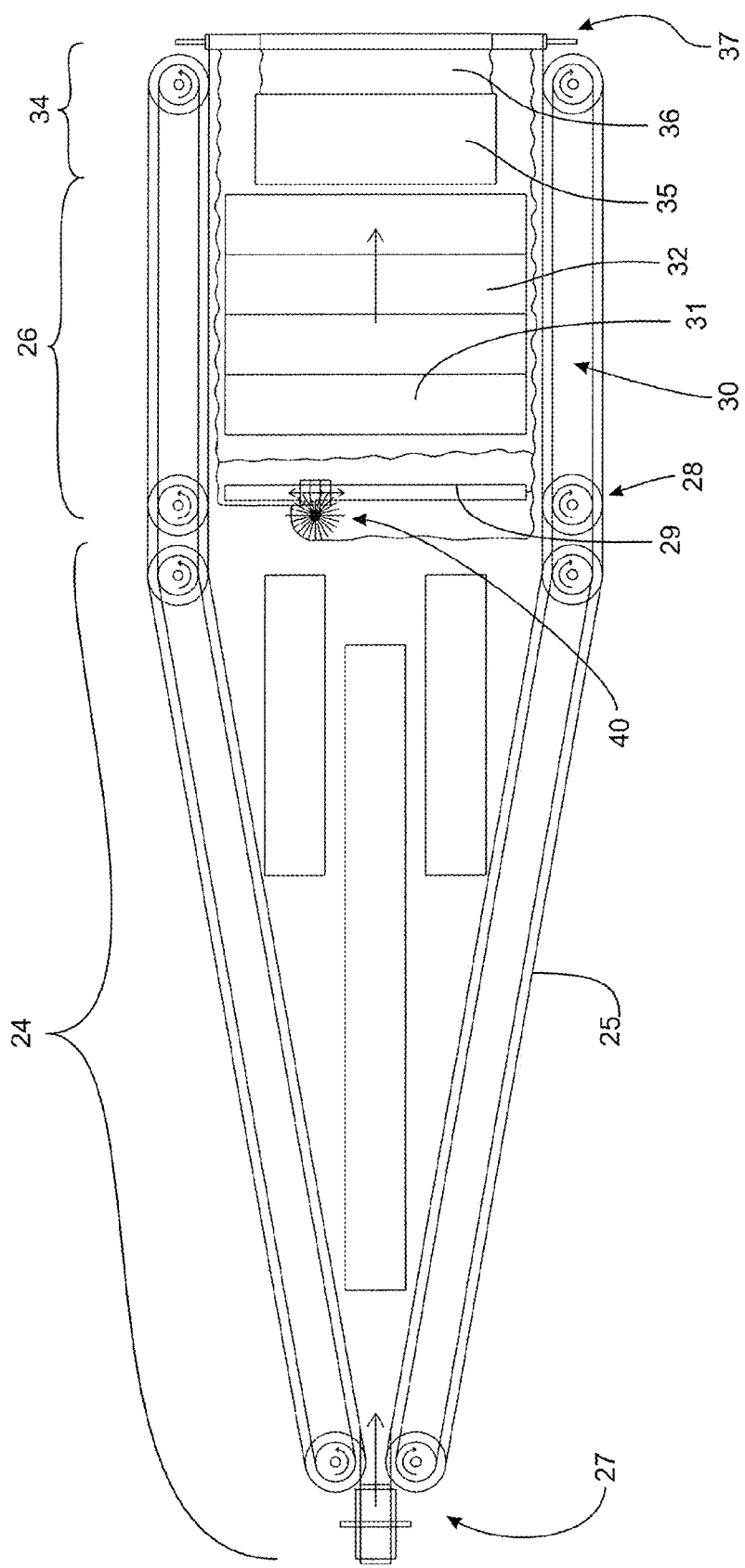
FIG. 9 is a schematic drawing of one embodiment of the steps of stretching the tape in the transverse direction, matting the unsintered or partially sintered, ePTFE tape, and sintering the ePTFE membrane, according to the instant invention.

The next step after machine direction stretching may be an optional step 24 of stretching tape 17 in the transverse direction (TD), or cross-machine direction. See FIG. 9. Step 24 may be for stretching tape 17 in the transverse direction to orient the fibers in the transverse direction. This stretching may also reduce the thickness to create a more membrane or film like material. The total TD stretch provided in step 24 may be anywhere from 1:1 up to 100:1 Step 24 may include any steps for stretching tape 17 in the transverse direction. In one embodiment, step 24 may include passing tape 17 along a tenter frame 25. Tenter frame 25 may be a 25 foot tenter frame. Infrared heaters may also be used to heat the tape while performing TD stretching. As shown in FIG. 9, a pay-off spool 27 may be positioned at the beginning of the tenter frame 25. Step 24 may be carried out by stretching the tape in the TD direction one time, or in several passes.

In one embodiment, the MD and TD stretching, steps 22 and 24, respectively, may be done simultaneously. This simultaneous MD and TD stretching may be done on a tenter frame, or any other device that provides for simultaneous TD and MD stretching.

The result of the aforementioned steps of mixing, extruding, calendering, stretching (both MD and TD) may form and provide an unsintered, stretched PTFE membrane. These steps may be used in forming an ePTFE membrane or tube. An additional step of partially sintering the PTFE membrane may be included. This partial sintering may make the membrane easier to work with. The following details are the remaining steps in forming the ePTFE membrane or tube. These steps may be utilized for creating unique properties of the ePTFE membrane or tube.

The first step of making the ePTFE membrane or film (membrane is called film in FIGS. 2 and 10), after the unsintered or partially sintered ePTFE membrane is provided, may be a step 26 of matting the unsintered or partially sintered ePTFE membrane. See FIG. 9. Step 26 may be for matting down the membrane or densifying the membrane. Step 26 may include any steps for matting down the membrane or densifying the membrane. Step 26 may mat the membrane down and therefore reduce the thickness of the membrane. In one embodiment, step 26 may mat the membrane down and reduce the thickness between 25-90%. In another embodiment, step 26 may mat the membrane down and reduce the thickness between 40% and 80%. In another embodiment, step 26 may mat the membrane down and reduce the thickness between 60% and 75%. In one embodiment, step 26 may include: a step 28 of wetting the unsintered or partially sintered ePTFE membrane with a wettable liquid 29; and a step 30 of drying the wetted PTFE membrane.

Step 28 of wetting the unsintered or partially sintered ePTFE membrane with a wettable liquid 29 may be included in step 26 of matting the unsintered or partially sintered ePTFE membrane. See FIG. 9. Step 28 may be to add wettable liquid 29 to mat down the membrane or densify it. Wettable liquid 29 may be any liquid, including, but not limited to, an alcohol and a mineral solvent. The alcohol may be any alcohol, including, but not limited to, a lower alkyl alcohol, a methanol, an ethanol, a propanol, and a butanol. The alcohol may be mixed with water or a solvent. The mineral solvent may be any mineral solvent including any napthas. In one embodiment of step 28 of wetting the PTFE membrane, wettable liquid 29 may be sprayed on the PTFE membrane with a sprayer 40 moving back and forth across the membrane. In another embodiment, wettable liquid 29 may be sprayed on the PTFE membrane by a plurality of sprayers 40. The wettable liquid 29 may also be sprayed or poured on the membrane while being fed over a roll and then spread and lightly wiped with a rigid or flexible doctor blade or soft roller to mat the wet membrane. Ideally, wettable liquid 29 may be applied when the membrane is stretched close to its full width and length prior to sintering. Otherwise, the matted membrane may become unmatted and the desired densified result will not be realized.

Step 30 of drying the wetted PTFE membrane may remove wettable liquid 29 to form a matted PTFE membrane. See FIG. 9. Step 30 may include any steps for drying or removing wettable liquid 29 from the PTFE membrane. Step 30 may be done while restraining the membrane to prevent it from coming un-matted. This may include utilizing a tenter frame to pull the membrane out slightly but not enough to un-mat the matted membrane. In one embodiment of step 30, the PTFE membrane may be heated under a preheat heater 30. Preheat heater 30 may be for removing wettable liquid 29 before sintering. Wettable liquid 29 may be removed via evaporation under preheat heater 30. Preheat heater 30 must be set to a temperature high enough to evaporate wettable liquid 29 before sintering, but not too hot where wettable liquid 29 becomes volatile or where sintering of the material occurs (sintering typically occurs above 650° F. for ePFTE membranes). In one embodiment, preheat heater 30 may be set to a temperature of between 400° F. and 600° F. In another embodiment, preheat heater 30 may be set to a temperature of 550° F.

Although, the instant invention is directed toward matting via wetting the membrane with a wettable liquid, various other methods of matting the membrane may be used. These methods may include, but are not limited to, the following examples. The first example of other processes for matting the membrane may be to mat the membrane by passing the ePTFE membrane between nip rollers. In this example, one roll may have a smooth chrome surface, the other roll may have a 40 durometer silicone surface, the rolls may be pressed together with an air cylinder, the smooth roll may be driven by a gear motor, and the silicone roller may be mounted on bearings. Using this method, a 2 mil membrane may be matted or compressed to between 0.5 and 1 mil thickness. The surface however may not be uniform due to the difficulty of feeding unsintered membrane into the nip rolls. Another example of matting the ePTFE membrane may be by lightly compressing it between a smooth flat or curved surface and a low durometer foam rubber with tight weave liner. In this process, a roller may be used to apply pressure over the foam rubber pad. With this process, a 2.5 mil membrane may be matted or compressed to 1 mil and may be similar to the IPA matted surface in uniformity except for a texture pattern embossed from the liner on the surface. However, since the matting was done on a flat glass plate the process of matting using this method could not be performed in a continuous manner. Another example of matting the ePTFE membrane may be lightly compressing it between a glass plate and a smooth metal foil. In this example, a rolling pin may be used to apply pressure over the foil. With this process, the resulting densified membrane surface of a 2.5 mil thick membrane may be compressed from 2.5 mil to 1 mil and may not be as uniform as the matted membrane made using the foam rubber pad (described above). Yet another example of matting the ePTFE membrane may be matting the membrane by tamping of the surface with a soft nonwoven. With this process, a 2.5 mil membrane may be matted or compressed from 2.5 mil to approximately 1 mil. The resulting surface may have a blotchy appearance. Yet another example of matting the ePTFE membrane may be matting the membrane by tamping of the surface with a soft brush. In this process, the membrane may be stretched over a flat glass plate. With this process, the membrane thickness of a 2.5 mil membrane may be reduced from 2.5 mil to approximately 1 mil. The resulting surface may have a scratched appearance. A final example of matting the ePTFE membrane may be matting the membrane by applying a low to high pressure stream of water. In this process, the membrane may be stretched over a flat glass plate.

However, none of the above attempts resulted in the same level of smooth uniform matted surface that is achieved by the method of this invention, that of matting with a fluid that soaks into and lightly packs the membrane fibers.

The next step after matting the ePTFE membrane may be a step 34 of sintering (or semi-sintering) the matted ePTFE membrane. Step 34 may be for heating the ePTFE membrane to a temperature with a time duration sufficient to partially or completely sinter the ePTFE membrane. Step 34 may be immediately after step 26 of matting the unsintered or partially sintered ePTFE membrane. Thus, method 10 may be without any stretching between step 26 of matting the PTFE membrane and step 34 of sintering (or semi-sintering) the matted polytetrafluoroethylene membrane. Step 34 may include any sintering or semi-sintering techniques known in the art. Step 34 may be accomplished by sintering the membrane under an IR heater, over a heated roller, or in a batch or converyorized convection oven. In one embodiment, step 34 may include heating the ePTFE membrane in a high temperature sintering oven 35 to a sintering or semi-sintering temperature. In one embodiment of sintering oven 35, the sintering temperature may be between 600° F. and 1100° F. In another embodiment, the sintering temperature may be between 750° F. and 935° F. The sintering temperature may be above 680° F. The use of the higher temperatures allows faster processing rates, plus it can be used to purposely degrade the most outer layer of the surface which enlarges surface cavities. This over sintering and surface degrading is referred to as Hyper-Sintering™ by Phillips Scientific, Inc. of S.C., and can be useful for medical applications where a coarser surface texture may be desired, or in filtration applications to increase fluid flow across the membrane, or in application where the coarse surface improves bonding to other films or nonwoven materials. Step 34 may include any steps for sintering the ePTFE membrane. In one embodiment, step 34 may include a step 36 of fine tuning sintering via visual detection.

Figure 19:
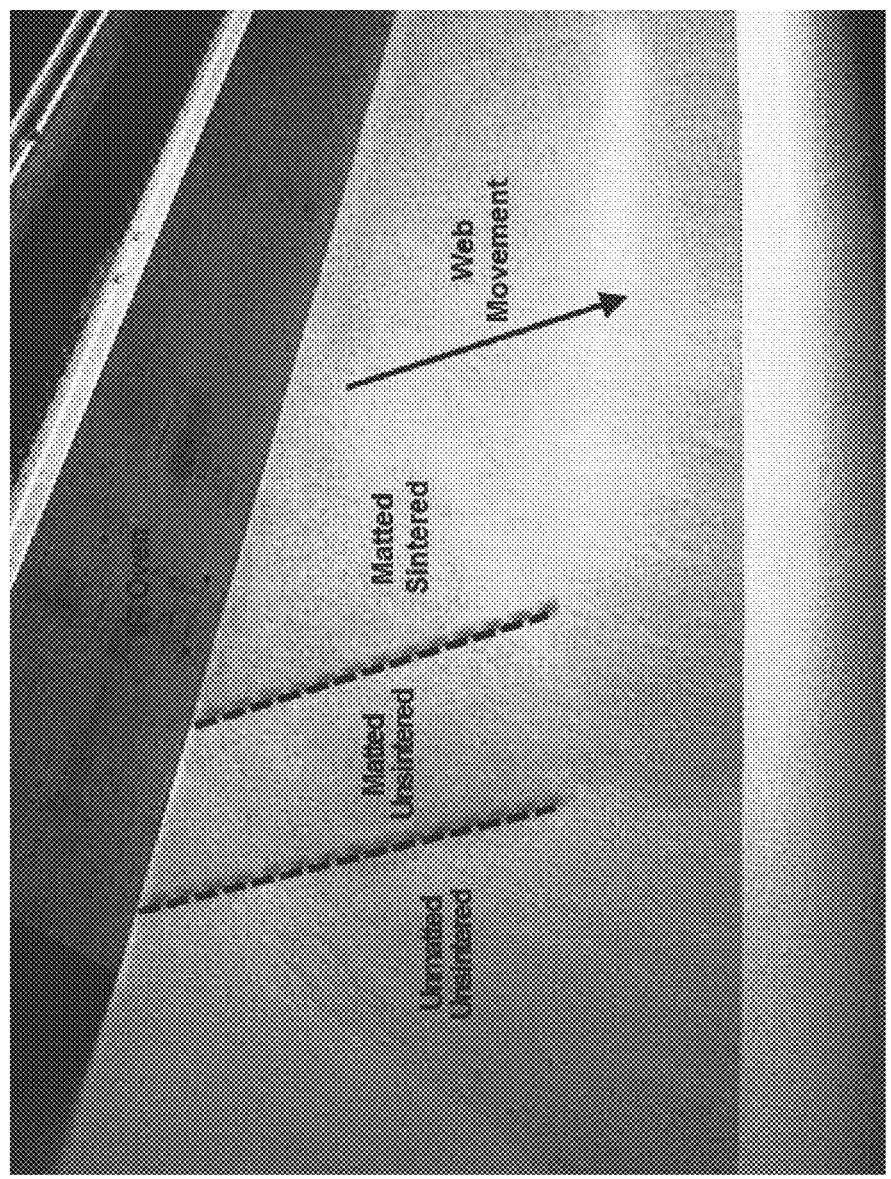
FIG. 19 is a photograph of an ePTFE membrane made according to the instant invention showing the location of different off white color hues for the step of fine tuning sintering via visual detection.
Figure 20:
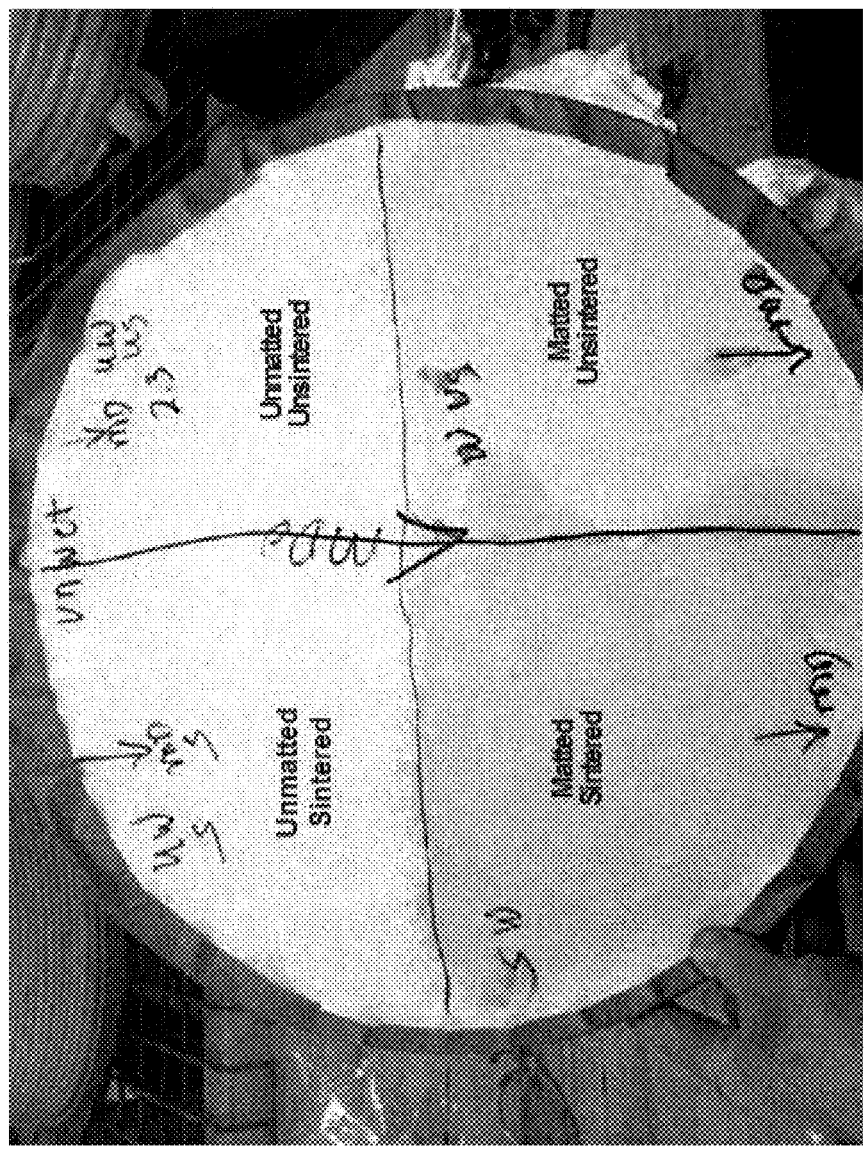
FIG. 20 is another photograph of an ePTFE membrane made according to the instant invention showing the different off white color hues for the step of fine tuning sintering via visual detection.

Step 36 of fine tuning sintering via visual detection may be performed by examining the ePTFE membrane after sintering and determining the opaqueness of the membrane. See FIGS. 19-20. FIG. 19 shows an ePTFE membrane as it exits sintering oven 35 at the end of production. FIG. 20 shows an ePTFE membrane draped over a bowl where the ePTFE membrane was sintered and/or matted manually. Each of these photographs show the effects of matting and/or sintering on the opaqueness or hues of the ePTFE membrane. As a result, one advantage of matting step 26 may be the ability to readily detect whether the ePTFE membrane becomes sintered by visual means. There are three distinct bands of off white that result, where each band differs by its opaqueness. On each edge of the membrane a lighter white opaque band is seen which indicates unsintered and unmatted ePTFE membrane. The next band from the edge is slightly darker (less opaque) in hue and indicates membrane that has been matted but is unsintered. The final band which forms the center section of the sintered membrane is even darker (less opaque) off white hue and indicates that the membrane is matted and sintered. If the power to high temperature sintering oven 35 were turned down, one would notice that the center band of the membrane exiting from under the heater would become narrower. This visual feedback provides a good method for fine tuning the sintering temperature required to adequately sinter the membrane without degrading the membrane by over sintering. The measured temperature at the location just under the membrane being sintered may be between 900° F. and 1000° F. which is much higher than the temperature required to sinter, thus, the visual feedback by examination of the distinct bands is important. In other words, the opaqueness of the membrane can determine whether or not the membrane has been sintered properly. Thus, if the membrane is less opaque than desired, the temperature may be raised. Conversely, if the membrane is more opaque than desired, the temperature may be lowered.

The above process 10 may be for making an ePTFE membrane or film. The film may be taken up on a take-up spool 37, as shown in FIG. 9. The following process 100 may be for making an ePTFE tube. See FIG. 10. The ePTFE tube may provide a tube with unique properties including, but not limited to, low friction, high strength, ultra thin wall, minimal or no seam line visibility, and good bonding properties to other polymers and nonwovens. The resulting ePTFE tube may be particularly useful for such applications, including, but not limited to, medical and industrial applications.

The first step of method 100 of manufacturing an ePTFE tube, similar to method 10, may be a step 102 of providing an unsintered or partially sintered ePTFE membrane. See FIG. 10. Step 102 may be exactly the same as step 12 of method 10 described above. This includes, the steps of mixing, extruding, calendering, stretching (both MD and/or TD) to form and provide a unsintered or partially sintered ePTFE membrane. The following details the remaining steps in forming the ePTFE tube. These steps may create the unique properties of the ePTFE tube.

The first step of method 100 of making the ePTFE tube, after the unsintered or partially sintered ePTFE membrane is provided, may be a step 104 of wrapping the unsintered or partially sintered ePTFE membrane around a mandrel or form tool 106 to form a tube 107. See FIG. 10. Step 104 may be for creating tube 107 out of the membrane. Step 104 may include wrapping the membrane around mandrel or form tool 106 any number of times to form tube 107. The number of times the membrane is wrapped around mandrel or form tool 106, the tension, and the thickness of the membrane may determine the thickness of tube 107. For example, a 0.1 mil thick membrane may be wrapped around mandrel or form tool 106 80 to 200 times to create a 10 mil thick tube 107, depending on the tension. Mandrel or form tool 106 may be any known mandrel or form tool known in the art for wrapping membranes to create a tube like structure. The mandrel or form tool may be a metal, glass, fluoropolymer, or ceramic mandrel or form tool. Step 104 may include any steps for wrapping the PTFE membrane around the mandrel, including, but not limited to: chucking the mandrel between centers; paying off the membrane over the mandrel; cutting the edge of the membrane and adhere by brushing or pressing the edge to the mandrel; rolling up a length of the membrane to build up the wall of the tube to its desired thickness; cutting the end of the membrane; and brushing or pressing the edge of the membrane on the previous layer.

Tube 107 created by step 104 of wrapping the unsintered or partially sintered ePTFE membrane around a mandrel or form tool 106 to form a tube 107 may include any size or shape tube. As should be understood by one skilled in the art, the size and shape of tube 107 may be determined by the size and shape of mandrel or form tool 106.

Prior to step 104, the ePTFE membrane may be provided in an unsintered state or a slightly sintered state. Having the membrane unsintered or slightly sintered may allow for improved wrapping of the membrane around mandrel or form tool 106 by allowing the layers to slightly smear into one another to improve the fiber contact between layers. The slight mismatch that occurs between layers also may improve the transverse of axial strength of the resulting sintered tube. The relative tackiness of the unsintered or semisintered membrane also provides a better adhesion between layers when the tube or profile is sintered. This may be due to the slight entanglement of fibers at the contact surface between layers that provide a mechanical attachment when the fibers are sintered and become more rigid.

The next step of method 100 of making the ePTFE tube, after the membrane is wrapped to form tube 107, may be a step 108 of matting the ePTFE tube. See FIG. 10. Step 108 may be for matting down the tube or densifying the tube. Step 108 may include any steps for matting down the tube or densifying the tube. Step 108 may mat the tube down and therefore reduce the thickness of the tube prior to sintering. In one embodiment, step 108 may mat the tube down and reduce the thickness between 25-90%. In another embodiment, step 108 may mat the tube down and reduce the thickness between 40% and 80%. In another embodiment, step 108 may mat the tube down and reduce the thickness between 60% and 75%. In one embodiment, step 108 may include: a step 110 of wetting the wrapped ePTFE tube with wettable liquid 29; and a step 112 of drying the wetted ePTFE tube. An optional step of applying pressure to the tube may also be included to help mat it down.

Step 110 of wetting the wrapped ePTFE tube with wettable liquid 29 may be included in step 108 of matting the wrapped ePTFE tube. See FIG. 10. Step 110 may be to add wettable liquid 29 to mat down the tube or densify it. As discussed before, wettable liquid 29 may be any liquid, including, but not limited to, an alcohol or a mineral solvent. The alcohol may be any alcohol, including, a lower alkyl alcohol. The mineral solvent may be any mineral solvent including any napthas. Step 110 of wetting the wrapped ePTFE tube with wettable liquid 29 may include wetting by any means, including, but not limited to, spraying, dipping, or brushing wettable liquid 29 onto the tube. This wetting process my be applied to the whole tube or just portions of the tube and may be done manually or may be automated. Wettable liquid 29 may be applied prior to sintering or the matted tube will become unmatted and the desired densified result will not be realized. If a fluid that wets the ePTFE tube, such as IPA, is soaked into a single layer or multiple layers of a wrapped tube, the resulting material when sintered may have a substantially higher density and strength, based on cross sectional area. The wetting fluid (for example, IPA) aids in minimizing the appearance of the seam formed by the outer layer of membrane. The matted membrane end sticks better to the previous wrapped layer forming a better sintered bond to the previous layer. Matting of layers may provide good surface contact to allow better fiber to fiber contact and prevent the edge from lifting up during the later steps of sintering.

Step 112 of drying the wetted ePTFE tube may remove wettable liquid 29 to form a matted ePTFE tube. See FIG. 10. Step 112 may include any steps for drying or removing wettable liquid 29 from the ePTFE tube. In one embodiment of step 112, the ePTFE tube may be dried by the application of a heater or by placing the tube into an oven. The heater or oven may be for evaporating wettable liquid 29 before sintering.

The next step of method 100 after matting the ePTFE tube may be a step 114 of sintering the matted ePTFE tube. Step 114 may be for heating the ePTFE tube to a temperature just before its melting point to lock in its physical properties. Step 114 may be immediately after step 108 of matting the wrapped ePTFE tube. Thus, method 100 may be without any stretching between step 108 of matting the ePTFE tube and step 114 of sintering the matted ePTFE tube. Step 114 may be accomplished by sintering the membrane under an IR heater, or in a batch or converyorized convection oven. In one embodiment, step 114 may include heating the ePTFE tube in a high temperature sintering oven 35 to a sintering temperature. In one embodiment, the sintering temperature may be between 600° F. and 1100° F. In another embodiment, the sintering temperature may be between 750° F. and 935° F. The sintering temperature may be above 680° F. Typical sintering temperatures are between 680° F. and 740° F. As with the membrane, the use of the higher temperatures allows faster processing rates, plus it can be used to purposely degrade the most outer layer of the surface which enlarges surface cavities. This over sintering and surface degrading is referred to as hyper-sintering and can be useful for medical applications where a coarser surface texture may be desired, or in filtration applications to increase fluid flow across the membrane, or in application where the coarse surface improves bonding to other films or nonwoven materials. Step 114 may include any steps for sintering the ePTFE tube.

The next step of method 100 after sintering the ePTFE tube may be a step 116 of removing the sintered ePTFE tube from mandrel or form tool 107. Step 116 may include any steps for removing the tube from mandrel or form tool 107.

Figure 10:
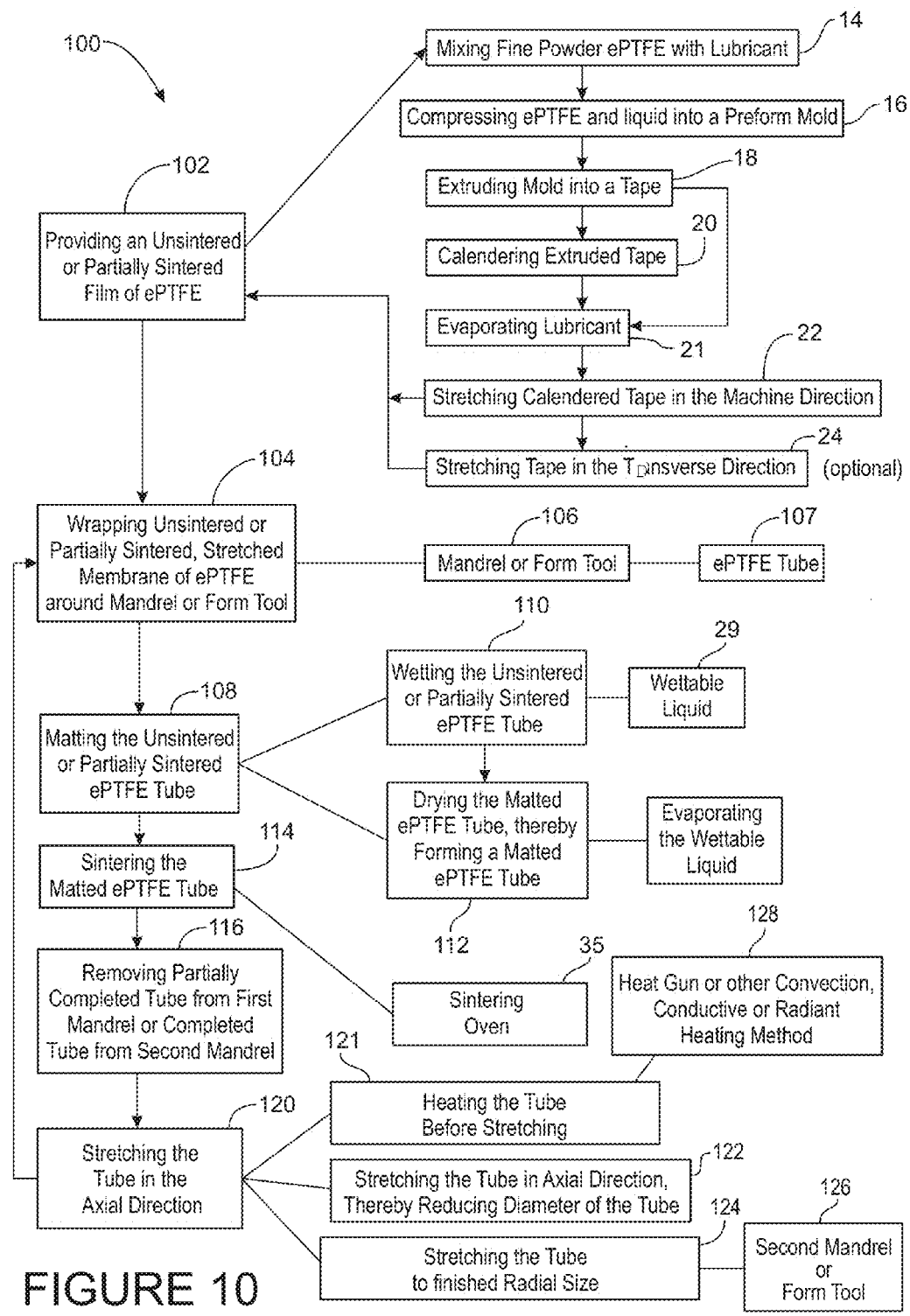
FIG. 10 is a flow diagram of one embodiment of the method of making an ePTFE tube according to the instant invention.
Figure 11:
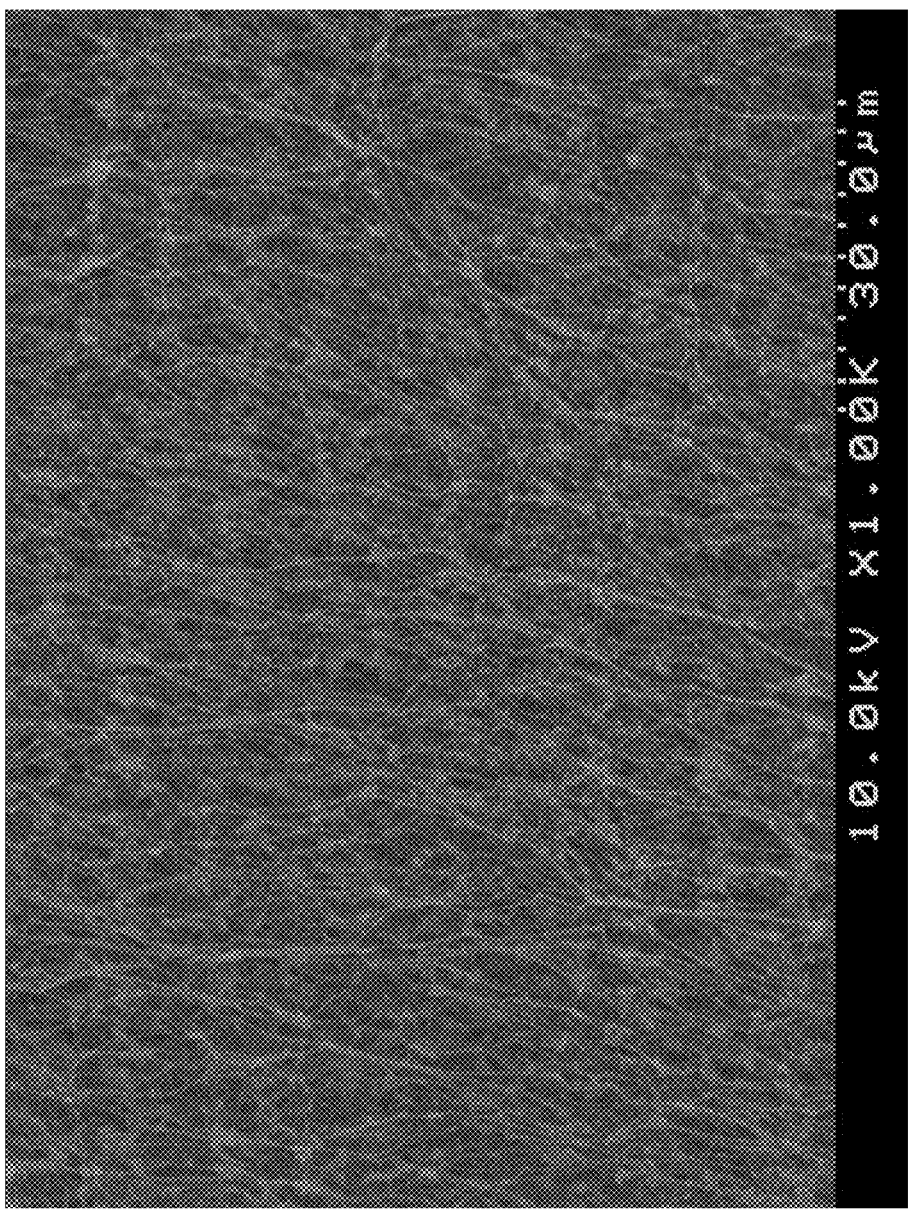
FIG. 11 is an SEM photograph of one embodiment of the instant invention of an unmatted ePTFE membrane used to make a matted tube, as described in Example 1A.
Figure 12:
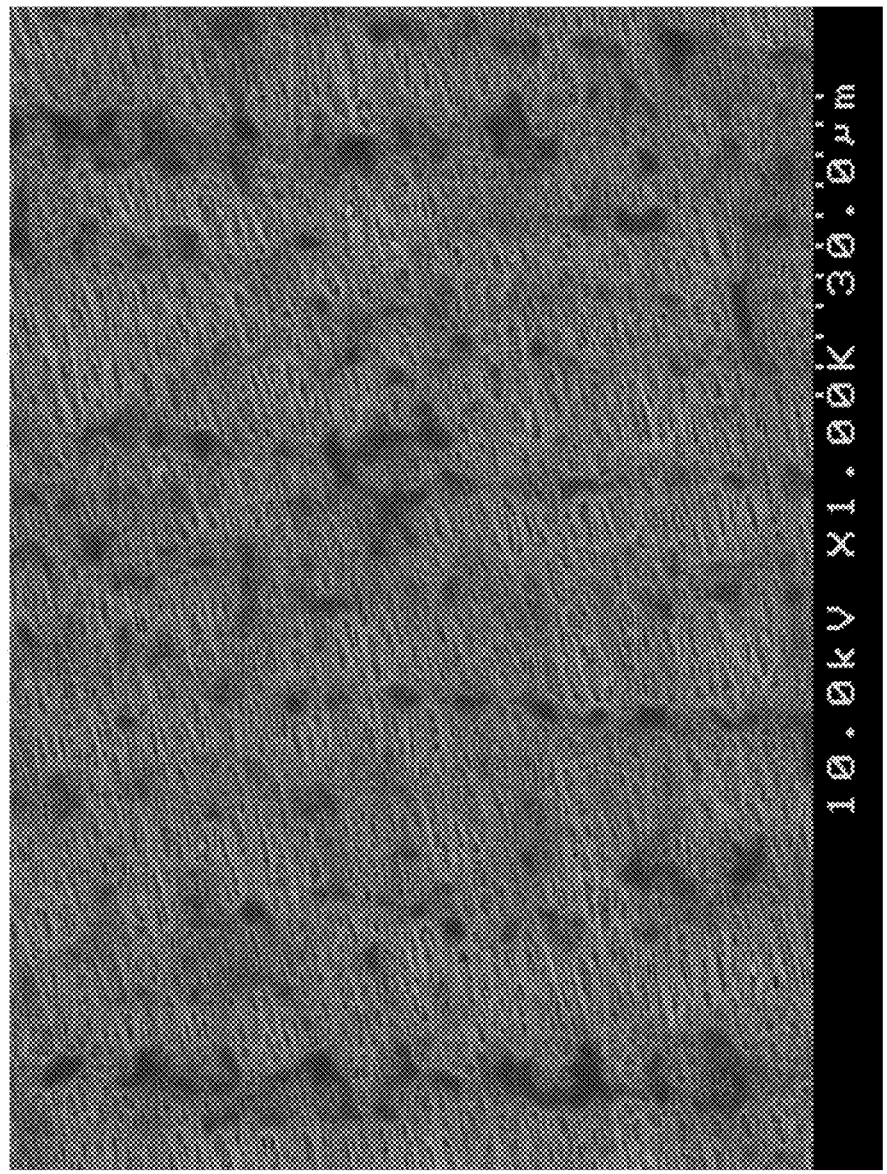
FIG. 12 is an SEM photograph of one embodiment of the instant invention of the inside of a matted ePTFE tube, as described in Example 1A.

The next step of method 100 after removing the ePTFE tube from mandrel or form tool 107 may be a step 120 of stretching the sintered ePTFE tube in the axial direction (see FIG. 10). Step 120 may be for reorienting the strength of tube 107 from radial to axial. Step 120 may also be for reducing the diameter of tube 107. Step 120 may include any steps for stretching tube 107 in axial direction. Step 120 of stretching the sintered ePTFE tube in the axial direction may include the steps of: a step 122 of stretching the tube in the axial direction thereby reducing the diameter of the ePTFE tube; and a step 124 of stretching the tube to a finished radial size. In addition, step 120 may optionally include a step 121 of heating the tube before axial stretching.

Step 122 of stretching the sintered ePTFE tube in the axial direction thereby reducing the diameter of the tube may be included in method 100 (see FIG. 10). The stretching may be by pulling on the ends of tube 107 to stretch the tube axially. This may render the ePTFE tube more uniform. This axial stretching may reorient the tubing fibers so that the strength in the radial direction is reduced while the axial strength is increased. Additional sintering of the reoriented tube will lock in the reorientation to a certain degree. The matted, radially wound tubes may be reduced approximately in diameter in proportion to the degree that the tube is stretched. Stretching a tube with a 2 inch diameter by 2:1 reduces the diameter by approximately 2:1 to a final diameter of approximately 1 inch.

Step 124 of stretching the sintered ePTFE tube to a finished radial size may be included in method 100 (see FIG. 10). Step 124 may include any steps or methods stretching the ePTFE tube to a finished radial size. Step 124 may stretch or increase the diameter of the ePTFE tube. Step 124 of stretching the tube to a finished radial size may include, but is not limited to, a step 126 of inserting a second mandrel or form tool 126 into the ePTFE tube. The second mandrel or form tool 126 may radially stretch the ePTFE tube. In one embodiment, the second mandrel or form tool 126 may have a diameter that is larger than the diameter of the reduced diameter ePTFE tube but less than the diameter of the first mandrel or form tool 106.

Step 121 of heating the ePTFE tube before axial stretching may be included in method 100 (see FIG. 10). Step 121 may be for heating the ePTFE tube to facilitate stretching. Step 121 may include any steps or processes for heading the ePTFE tube. In one embodiment, step 121 of heating the ePTFE tube before axial stretching may include: a step of restraining the tube between clamps; and a step of heating the clamped ePTFE tube with a heat gun 128 or other convection, conductive or radiant heating methods or devices.

Once stretched in the axial direction and to a finished radial size, a multilayer ePTFE tube may be optionally created. This multilayer ePTFE tube may be made by wrapping a second ePTFE membrane around the stretched ePTFE tube positioned on the second mandrel or form tool 126 to create a multilayer ePTFE tube. The step of wrapping a second ePTFE membrane around the stretched ePTFE tube positioned on second mandrel or form tool 126 to create a multilayer ePTFE tube may include the steps of: providing an unsintered or partially sintered second ePTFE membrane; wrapping the unsintered or partially sintered second ePTFE membrane around the stretched ePTFE tube positioned on the second mandrel or form tool 126; matting the multilayer ePTFE tube formed by the second ePTFE membrane wrapped around the axial and radially stretched ePTFE tube; immediately thereafter, sintering the matted multilayer ePTFE tube; and removing the sintered multilayer ePTFE tube from the second mandrel or form tool 126. In addition, the multilayer ePTFE tube created by this process could be repeated to create additional layers.

The multilayer ePTFE tube can be created in many different ways to obtain various advantages. For example, applying a radial wrap over a reoriented tube without matting the surface by rewetting may result in a softer lower density surface on the side that the radial wrap was applied. As another example, multiple radial wraps with the matting step applied or with the matting step omitted can be utilized to develop internal or external layers of varying density. As another example, multiple reoriented tubes can be combined with radially wrapped membrane to form multi-ply tubing having internal and/or external layers of varying density. As yet another example, the matted radial over wrap step can be used to encapsulate wire or polymer coils, stents, or other items designed to reinforce, improve bend radius, or provide a multi-lumen conduit. As yet another example, use of a brush or pad may aid removal or excess wetting and matting fluid or trapped air that may become trapped under the membrane layers. The tube can be rotated while the brush or pad is slowly moved from the center of the wrapped tube to the left or right to squeeze and remove the trapped fluid or air.

Figure 13:
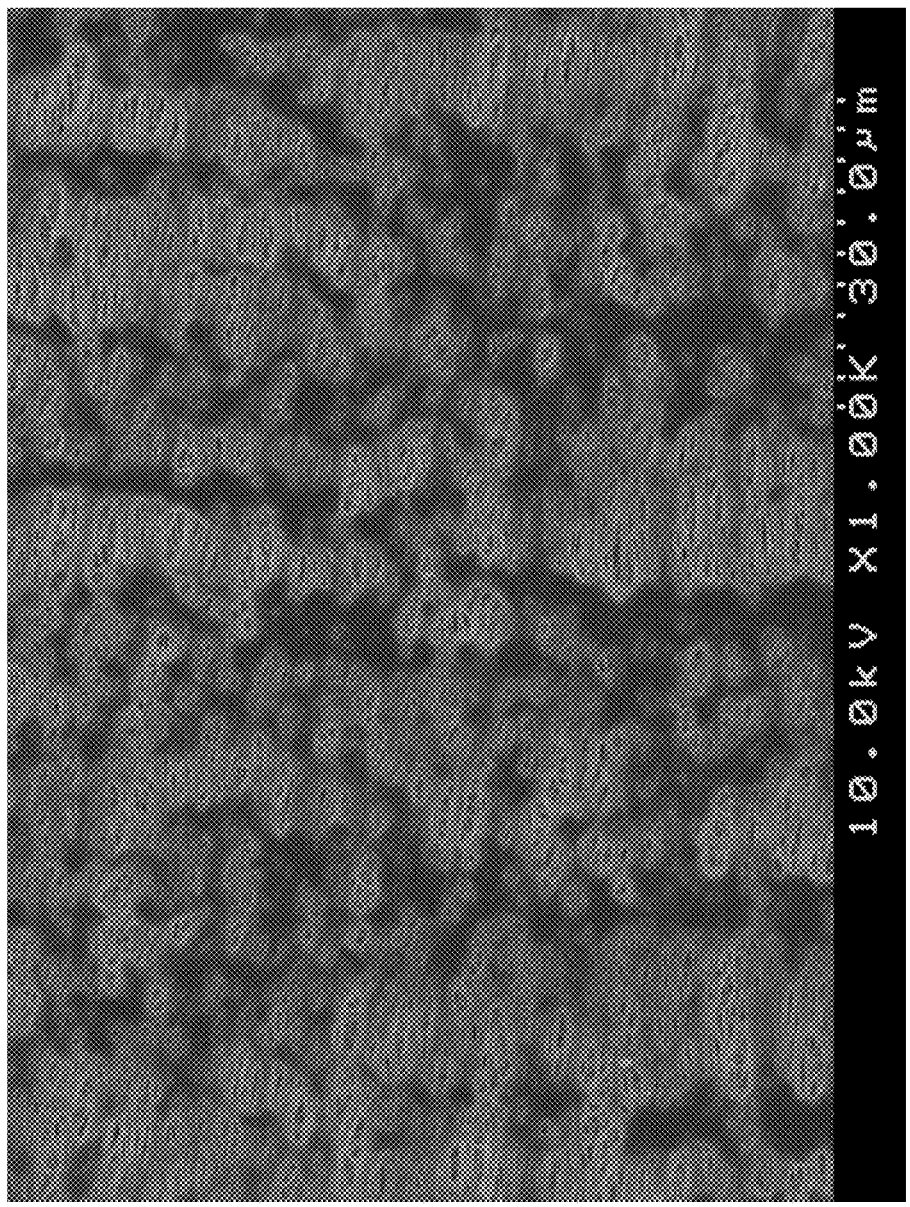
FIG. 13 is an SEM photograph of one embodiment of the instant invention of the outside of a matted ePTFE tube, as described in Example 1A.
Figure 14:
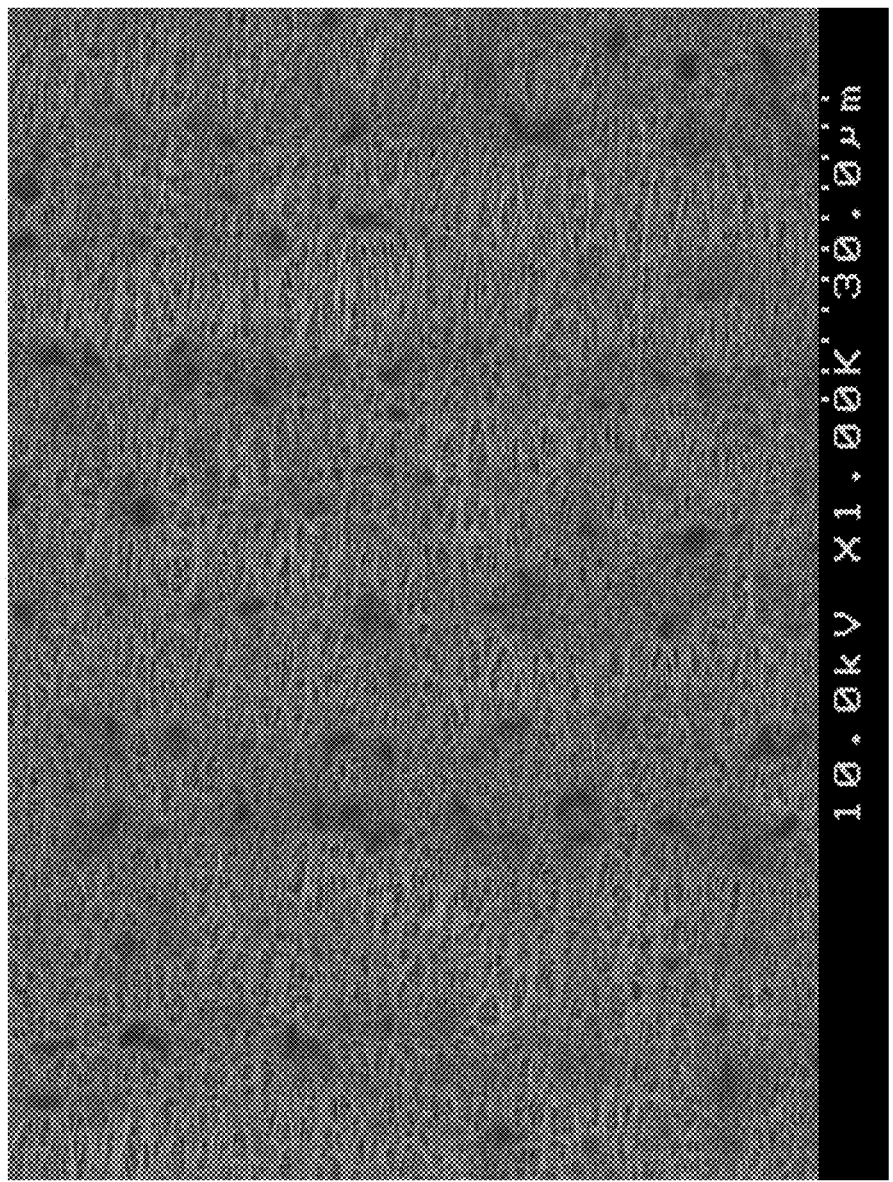
FIG. 14 is an SEM photograph of the inside of an un-matted ePTFE tube, as described in Example 1B.
Figure 15:
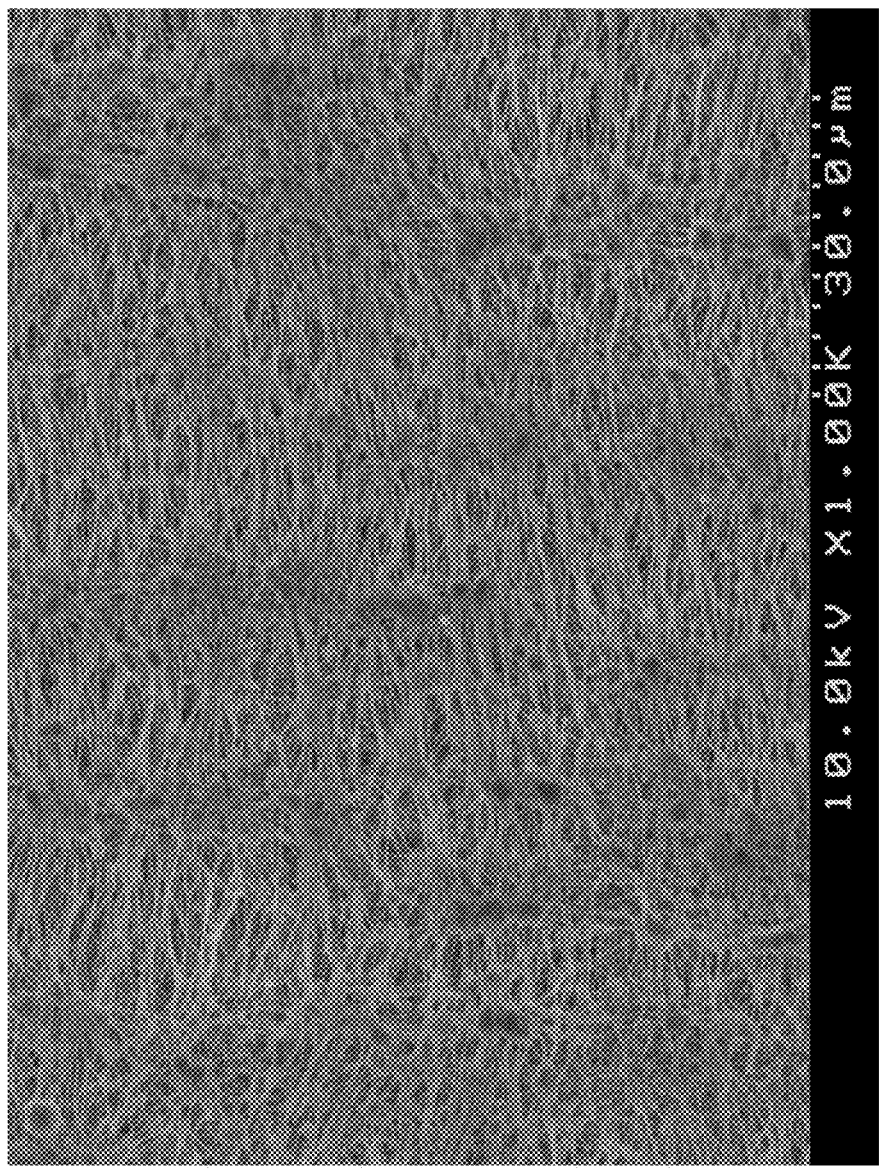
FIG. 15 is an SEM photograph of the outside of an un-matted ePTFE tube, as described in Example 1B.
Figure 16:
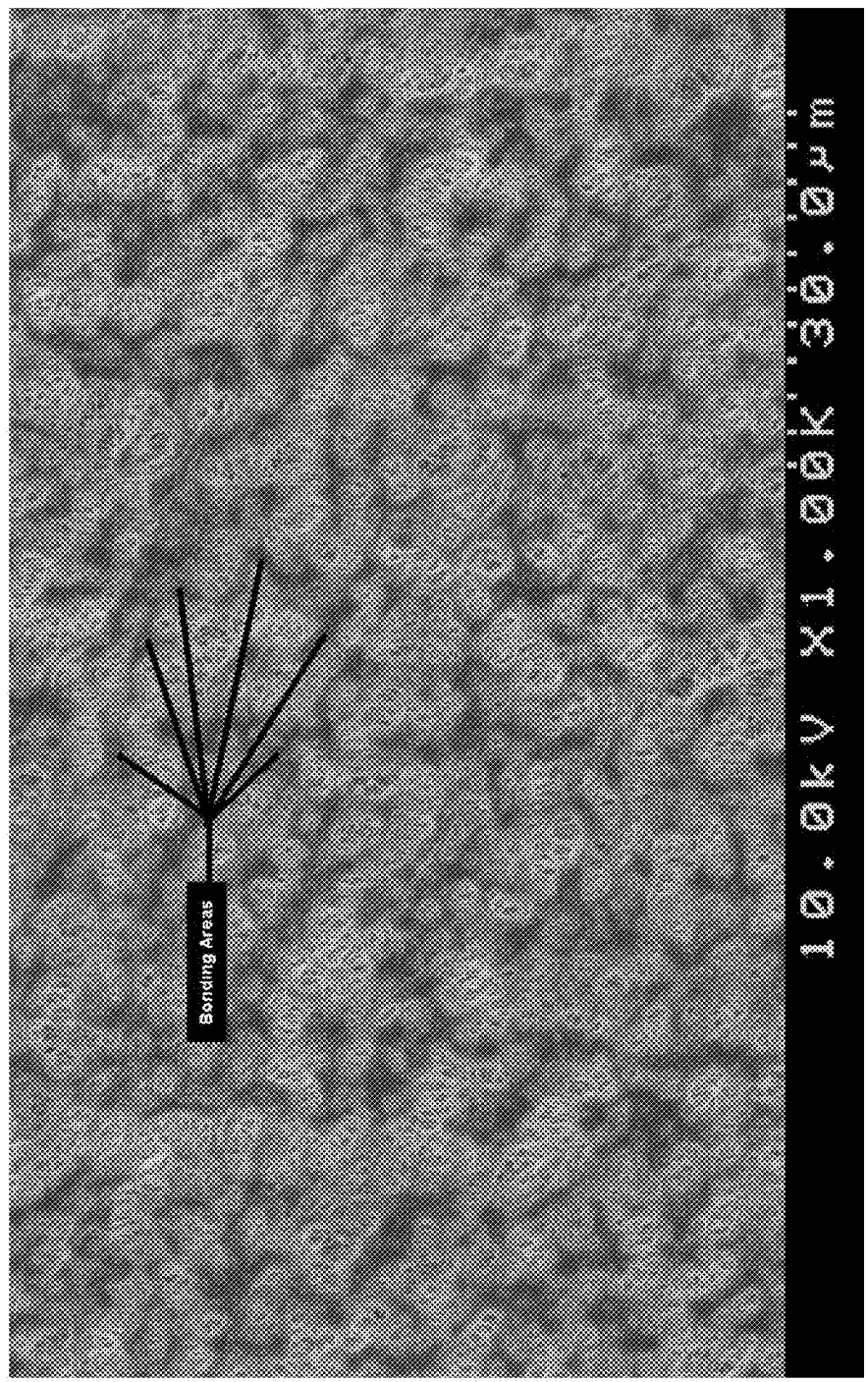
FIG. 16 is an SEM photograph of one embodiment of the instant invention of a matted ePTFE membrane, as described in Example 5.
Figure 17:
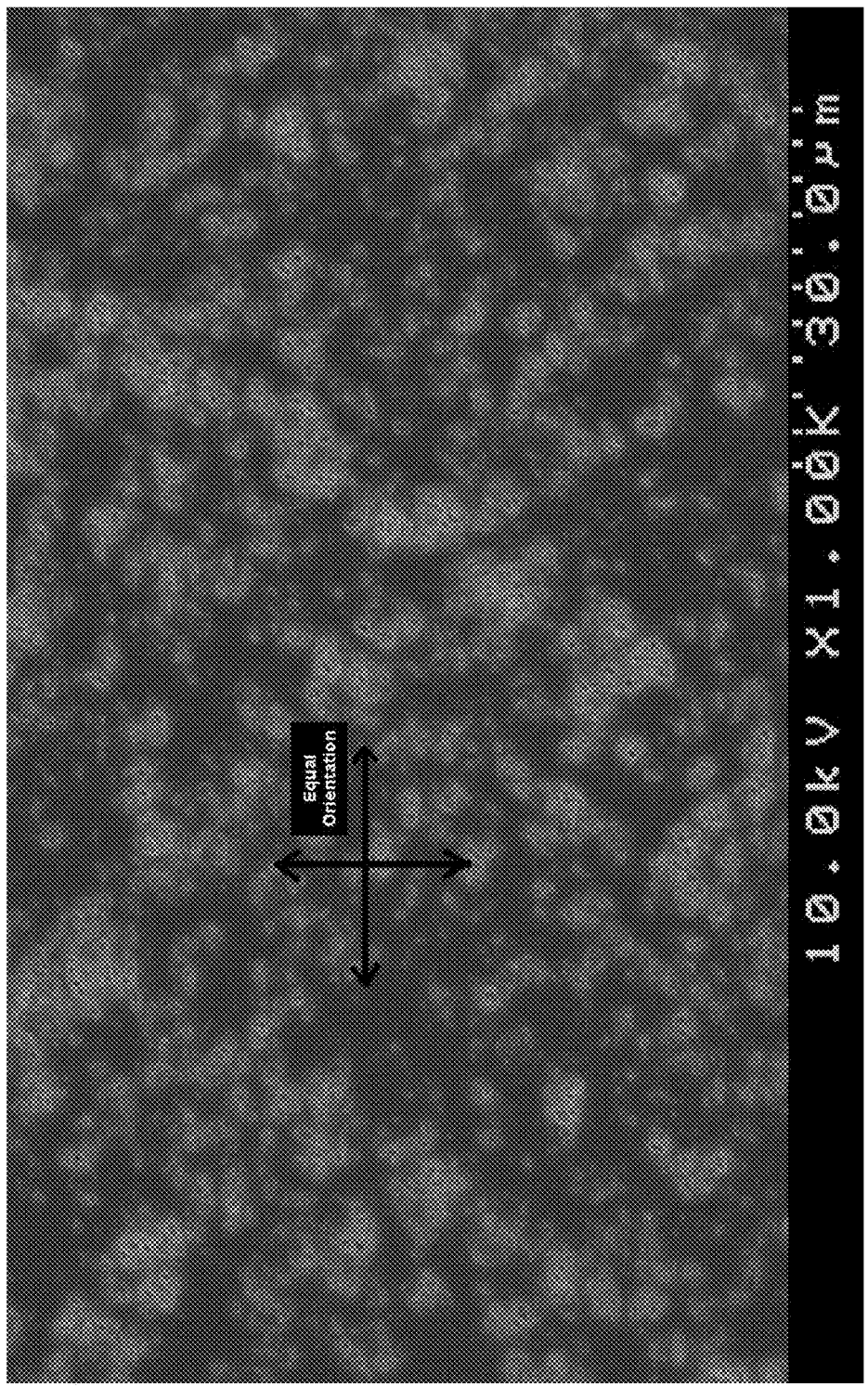
FIG. 17 is an SEM photograph of one embodiment of the instant invention of a drawn down and matted ePTFE tube, as described in Example 6.
Figure 18:
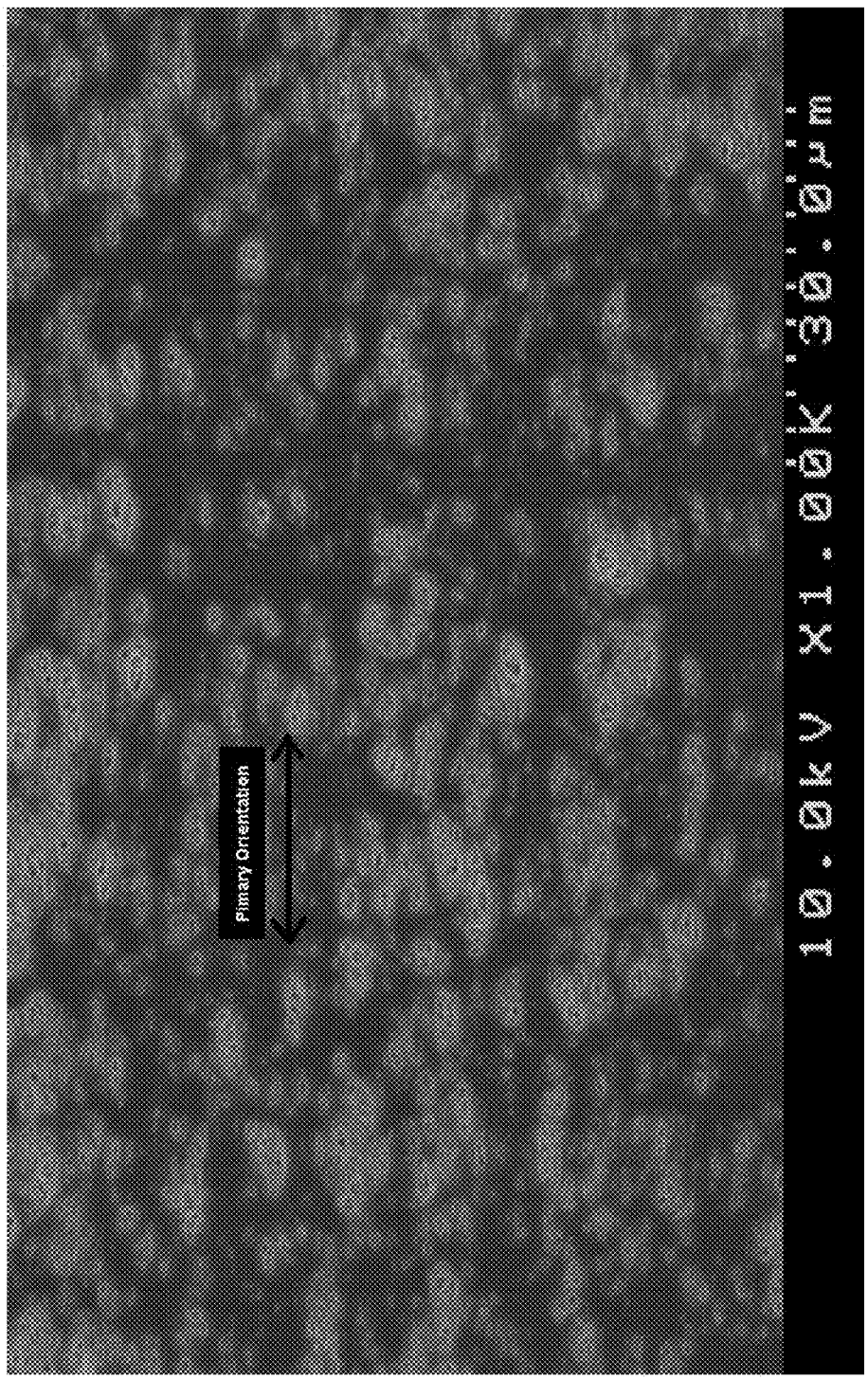
FIG. 18 is an SEM photograph of another embodiment of the instant invention of a matted ePTFE tube that is not drawn down, as described in Example 6.

An ePTFE tube may be made according the above described process. The ePTFE tube may be different from the prior art ePTFE tubes because of the matting step. One unique property of this matted ePTFE tube may be that it is made with a membrane having a coefficient of friction that is less than similarly made tubes not made according to the process of the instant invention. The coefficient of friction was measured by a method similar to that described above for the membrane. In one embodiment, the matted ePTFE membrane used in the ePTFE tube may have a coefficient of friction of less than 0.40. In another embodiment, the matted ePTFE membrane used in the ePTFE tube may have a coefficient of friction of less than 0.35. The reduced coefficient of friction may be due to the increased number of dense areas that are formed on the matted surface (FIG. 13) as compared to the unmatted tube surface (FIG. 15).

The ePTFE tube made according to the instant invention may also include other improved properties over a similar non matted ePTFE tube. These improved properties include: improved tensile strength in both the radial and axial directions (similar to TD and MD directions), reduced equivalent pore size as measured by the bubble point, and reduced permeability as measured by the gurley number. In one embodiment of the ePTFE tube made according to the instant invention, the tensile strength in the machine direction of the matted ePTFE membrane making up the tube may be improved by at least 200% when compared to the MD tensile strength of a similar unmatted ePTFE membrane. In another embodiment of the ePTFE tube made according to the instant invention, the tensile strength in the transverse direction of the matted ePTFE membrane making up the tube used may be improved by at least 200% when compared to the TD tensile strength of a similar unmatted ePTFE membrane. In yet another embodiment of the ePTFE tube made according to the instant invention, the gurley number of the matted ePTFE membrane making up the tube may be increased by at least 150% when compared to the gurley number a similar unmatted ePTFE membrane. In yet another embodiment of the ePTFE tube made according to the instant invention, the bubble point of the matted ePTFE membrane making up the tube may be increased by at least 125% when compared to the bubble point of a similar unmatted ePTFE membrane.

The method of this invention, including matting by wetting immediately prior to sintering, may also improve the encapsulation of another material or article between wraps of ePTFE that form the inner and outer layers of a tube or multi-layered sheet. The encapsulated material may be metallic, a fluoropolymer, or carbon in the form of a wire, flat ribbon, a thin perforated mesh or a perforated tubular form such as a stent.

EXAMPLES

Extremely thin unsintered ePTFE membrane of a thickness of 0.1 mil was produced in a manner described above. The membrane was highly machine direction oriented so that the machine direction strength was at least 10 times greater than the transverse direction strength when measured at a 2:1 stretch. Three linear feet of 0.1 mil thick ePTFE membrane was wrapped around a mandrel having a diameter of 2 inches. IPA was applied to the wrapped membrane to mat the membrane. The matted tube was placed in a convection oven and sintered at 705° F. The ePTFE tube was removed from the 2 inch diameter mandrel. The 2 inch diameter ePTFE tube was next clamped to a vice and heated with a Model 775 heat gun manufactured by Wagner Spray Tech Corp. As the tube was heated, tension was applied to stretch or draw the tube in the axial direction. As the tube was heated and drawn down the tension of the tube increased until it was difficult to stretch the tube further by hand. The finished diameter of the drawn down tube was between 0.5 inches and 0.75 inches. The drawn down tube was pulled over a 1 inch diameter mandrel. One linear foot of the 0.1 mil unsintered ePTFE membrane was wrapped over the sintered ePTFE tube that was pulled over the 1 inch mandrel to create a multilayered tube. IPA was applied to the wrapped membrane to mat the membrane. After sintering again, the ePTFE tube was removed from the 1 inch diameter mandrel.

The resulting ePTFE tube wall thickness was between 0.5 mil and 0.8 mil thick. One (1) inch wide strips were cut in the axial and radial direction from the tube and the load to stretch from 1 inch length to 2 inch (2:1) was measured and compared to similar 1 inch wide radial and axial direction strips from an ePTFE tube made without the second application of radially wrapped, matted and sintered membrane.

Each sample was clamped between a stationary vice and the jaws of a tensile load testing unit. The initial tape length in the gap between the vice and jaws was 1 inch. The load gage was tared and the jaws on the tensile load testing unit moved upward until the tape length in the gap was 2 inches, at which point the load was recorded. The results of the tests are: the 1 inch by ½ mil wall ePTFE tube with additional radial wrap treatment had an axial direction load at 2:1 stretch of 1755 grams and a radial direction load at 2:1 stretch of 2430 grams; the 1 inch by ½ mil wall ePTFE tube without radial wrap treatment had an axial direction load at 2:1 stretch of 1003 grams and a radial direction load at 2:1 stretch of 197 grams.

The test results shown that a significant percent increase in axial and radial strength can be achieved with a second application of ePTFE material applied over the drawn down ePTFE tube. Since the radial and axial samples with the additional radial wrap treatment have approximately 66% more membrane by weight compared to the tube not having the radial wrap treatment, increases to the radial and axial loads would be expected. The weight increase is based on a 2:1 axial orientation so that the effective amount of membrane used in the first application is 3 ft/2=1.5 ft. Since the second application used 1 ft of membrane, the tubes having the second application of ePTFE material consist of approximately 1/1.5=0.66 or 66% more membrane by weight. However, the increase in tensile strength was significantly higher than expected in both the radial and axial directions. Not only did the second application of ePTFE material dramatically increase the radial strength by over 1000%, it also increased the axial strength much more than expected. Considering the fact that the membrane used for the second application radial wrap had less than $1/10^{th}$ as much transverse direction strength (axial direction when radially wrapped) as compared to the machine direction strength, only a small improvement in the axial strength would be expected), yet the samples tested showed a 75% increase in the axial tensile load. The tensile loads were measured at a 2:1 stretch.

It was also found that increasing the diameter of the initial tube relative to the finished diameter will provide increased axial strength compared to tubes made with a smaller initial diameter. A 3 inch initial ePTFE tube diameter will provide higher axial strength than a 2 inch initial ePTFE diameter tube diameter for a tube of 1 inch final diameter.

The present invention may be embodied in other forms without departing from the spirit and the essential attributes thereof, and, accordingly, reference should be made to the appended claims, rather than to the foregoing specification, as indicated in the scope of the invention.

We claim:

1. A method of making a thin walled ePTFE tube having improved axial and radial strength comprising the steps of:
   providing an unsintered or partially sintered ePTFE membrane;
   wrapping said unsintered or partially sintered ePTFE membrane around a first mandrel or form tool to form a tube;
   matting said tube; immediately thereafter, sintering said matted ePTFE tube;
   removing said sintered ePTFE tube from said first mandrel or form tool;
   stretching said sintered ePTFE tube in the axial direction;
   wrapping a second unsintered or partially sintered ePTFE membrane around the axially stretched tube thereby creating a multilayered ePTFE tube.

2. The method of making a thin walled ePTFE tube having improved axial and radial strength according to claim 1 where said step of matting said ePTFE tube including reducing the thickness of said tube between 25-90%.

3. The method of making a thin walled ePTFE tube having improved axial and radial strength according to claim 1 where said step of matting said ePTFE tube including reducing the thickness of said tube between 40-80%.

4. The method of making a thin walled ePTFE tube having improved axial and radial strength according to claim 1 where said step of matting said ePTFE tube including reducing the thickness of said ePTFE tube between 60% and 75%.

5. The method of making a thin walled ePTFE tube having improved axial and radial strength according to claim 1 where said matting step comprising the steps of:
   wetting said ePTFE tube including the step of spraying said wettable liquid on top of said ePTFE tube with a sprayer; and
   drying said wetted ePTFE tube including heating said tube under a preheat heater, thereby removing said wettable liquid and forming a matted ePTFE tube;

where said wettable liquid being selected from the group consisting of: an alcohol and a mineral solvent.

6. The method of making a thin walled ePTFE tube having improved axial and radial strength according to claim 1 where said step of sintering said matted ePTFE tube including heating said ePTFE tube in a high temperature oven to a sintering temperature.

7. The method of making a thin walled ePTFE tube having improved axial and radial strength according to claim 1 where said step of providing an unsintered or partially sintered ePTFE membrane including the steps of:
- mixing a fine powder polytetrafluoroethylene resin with a lubricant creating a mix;
- compressing said mix into a preform mold;
- extruding said molded mix into a tape;
- calendering said extruded tape;
- evaporating said lubricant from said extruded tape;
- stretching said calendered tape in the machine direction; and optionally
- stretching said calendered tape in the transverse direction;
- thereby, forming a unsintered or partially sintered ePTFE membrane.

8. A multilayered thin walled ePTFE tube having improved axial and radial strength being made according to the method of claim 1.

9. The method of making a thin walled ePTFE tube having improved axial and radial strength according to claim 1 wherein said step of wrapping said second unsintered or partially sintered ePTFE membrane around the axially stretched tube comprising the steps of:
- matting said multilayered ePTFE tube; and
- sintering said matted multilayered ePTFE tube.

10. The method of making a thin walled ePTFE tube having improved axial and radial strength according to claim 9 wherein said step of stretching said tube in the axial direction including:
- reducing the diameter of said ePTFE tube;
- reorienting the strength of said ePTFE tube from radial to axial; and
- stretching said tube to finished radial size.

11. The method of making a thin walled ePTFE tube having improved axial and radial strength according to claim 10 wherein said step of stretching said to finished radial size comprising the step of inserting a second mandrel into said ePTFE tube thereby radially stretching said ePTFE tube.

12. The method of making a thin walled ePTFE tube having improved axial and radial strength according to claim 11 wherein said second mandrel having a diameter being larger than the diameter of said reduced diameter ePTFE tube but less than the diameter of said first mandrel.

13. The method of making a thin walled ePTFE tube having improved axial and radial strength according to claim 9 wherein said step of stretching said sintered ePTFE tube in the axial direction further comprising the step of heating said ePTFE tube before axial stretching;
- wherein said step of heating said ePTFE tube before axial stretching including the steps of:
  - restraining said tube ends between clamps; and
  - heating said clamped ePTFE tube with a convection, radiant or conductive heat source.

14. The method of making a thin walled ePTFE tube having improved axial and radial strength according to claim 1 further comprising the step of wrapping a second ePTFE membrane around said stretched ePTFE tube positioned on said second mandrel to create a multilayer ePTFE tube.

15. A multilayered thin walled ePTFE tube having improved axial and radial strength being made according to the method of claim 14.

16. The method of making a thin walled ePTFE tube having improved axial and radial strength according to claim 1 wherein said step of wrapping a second unsintered or partially sintered ePTFE membrane around the axially stretched tube thereby creating a multilayered ePTFE tube comprising the steps of:
- providing an unsintered or partially sintered second ePTFE membrane;
- wrapping said unsintered or partially sintered second ePTFE membrane around said stretched ePTFE tube positioned on said second mandrel;
- matting said multilayer ePTFE tube formed by said second ePTFE membrane wrapped around said stretched ePTFE tube; immediately thereafter,
- sintering said matted multilayer ePTFE tube; and
- removing said sintered multilayer ePTFE tube from said second mandrel.

17. A multilayered thin walled ePTFE tube having improved axial and radial strength being made according to the method of claim 16.

18. A multilayered thin walled ePTFE tube having improved axial and radial strength comprising:
- a matted ePTFE membrane being wrapped around itself a plurality of times to form an ePTFE tube and being stretched in both the axial direction;
- a second matted ePTFE membrane being wrapped around said ePTFE tube to form the multilayered thin walled ePTFE tube;
- said multilayered thin walled ePTFE tube having a 50% or greater axial tensile strength and a 50% or greater radial tensile strength than an ePTFE tube formed without being matted or having an inner axially stretched layer.

19. The multilayered thin walled ePTFE tube having improved axial and radial strength of claim 18 wherein said multilayered thin walled ePTFE tube having a 75% or greater axial tensile strength and a 100% or greater radial tensile strength than an ePTFE tube formed without being matted or having an inner axially stretched layer.

20. The multilayered thin walled ePTFE tube having improved axial and radial strength of claim 18 wherein said tube having:
- a wall thickness between 40% and 80% of a similar unmatted ePTFE tube;
- a coefficient of friction of at least 25% less than the coefficient of friction of a similar unmatted ePTFE membrane with respect to a nonwoven wiper comprised of 55% Cellulose and 45% Polyester with a thickness of approximately 0.010";
- a tensile strength in the machine direction of at least 200% of the tensile strength of a similar unmatted ePTFE tube;
- a tensile strength in the transverse direction of at least 200% of the tensile strength of a similar unmatted ePTFE tube;
- a bubble point of at least 125% of the bubble point of a similar unmatted ePTFE tube; and
- a bonding force to LPDE of at least 40% more than the bonding force of a similar unmatted ePTFE tube.

* * * * *